United States Patent [19]

Tsutsumi

[11] Patent Number: 5,361,209
[45] Date of Patent: Nov. 1, 1994

[54] SUSPENSION CONTROL SYSTEM HAVING DAMPING COEFFICIENT DISCRETELY VARIED RESPONSIVE TO ROAD CONDITIONS

[75] Inventor: Yasuhiro Tsutsumi, Susono, Japan

[73] Assignee: Toyota Jidoshi Kabushiki Kaisha, Toyota, Japan

[21] Appl. No.: 7,917

[22] Filed: Jan. 22, 1993

Related U.S. Application Data

[63] Continuation of Ser. No. 622,534, Dec. 5, 1990, abandoned.

[30] Foreign Application Priority Data

Dec. 8, 1989 [JP] Japan .................................. 1-319682
Dec. 11, 1989 [JP] Japan .................................. 1-321225
Dec. 28, 1989 [JP] Japan .................................. 1-343151

[51] Int. Cl.$^5$ ........................................... B60G 17/015
[52] U.S. Cl. .............................. 364/424.05; 280/707
[58] Field of Search ................. 364/424.05; 380/703, 380/707, 840

[56] References Cited

U.S. PATENT DOCUMENTS

| 4,520,289 | 5/1985 | Sato et al. ........................... | 310/316 |
| 4,664,409 | 5/1987 | Nakashima et al. ................. | 280/707 |
| 4,666,180 | 5/1987 | Shirakuma .......................... | 280/707 |
| 4,717,172 | 1/1988 | Asami et al. ........................ | 280/707 |
| 4,717,173 | 1/1988 | Sugasawa et al. ................... | 280/707 |
| 4,729,580 | 3/1988 | Buma et al. ......................... | 280/707 |
| 4,741,554 | 5/1988 | Okamoto ............................. | 280/703 |
| 4,749,210 | 6/1988 | Sugasawa ............................ | 280/707 |
| 4,765,648 | 8/1988 | Mander et al. ...................... | 280/707 |
| 4,770,438 | 9/1988 | Sugasawa et al. ................... | 280/707 |

(List continued on next page.)

FOREIGN PATENT DOCUMENTS

| 0139145 | 5/1985 | European Pat. Off. . |
| 0151421 | 8/1985 | European Pat. Off. . |
| 0157181 | 10/1985 | European Pat. Off. . |
| 0311114 | 4/1989 | European Pat. Off. . |
| 1455823 | 5/1969 | Germany . |
| 3633159 | 4/1987 | Germany . |

(List continued on next page.)

Primary Examiner—Thomas G. Black
Assistant Examiner—Collin W. Park
Attorney, Agent, or Firm—Cushman, Darby & Cushman

[57] ABSTRACT

A suspension control system for controlling a suspension having a shock absorber provided for a wheel of a vehicle includes a damping force change rate detector which detects a damping force change rate indicating a rate of change of a damping force of the shock absorber, and a damping coefficient controller which alters the setting of the damping coefficient on the basis of a relationship between the damping force change rate and an adjustment reference value. The system also includes a damping coefficient alteration holding unit which continuously maintains the setting of the damping coefficient at a first level for a holding period after the damping coefficient controller alters the setting of the damping coefficient from a second level to the first level less than the second level, and a road surface condition judgement unit which judges whether or not a road surface on which the vehicle has traveled for the holding period is rough. Further, the system includes a holding period correction unit which elongates the holding period which is to be supplied to the damping coefficient alteration holding unit when the road surface condition judgment unit determines that the road surface is rough.

26 Claims, 21 Drawing Sheets

U.S. PATENT DOCUMENTS

| | | | |
|---|---|---|---|
| 4,787,650 | 11/1988 | Doi et al. | 280/707 |
| 4,797,823 | 1/1989 | Ikemoto et al. | 364/424.05 |
| 4,821,189 | 4/1989 | Hennecke et al. | 364/424.05 |
| 4,853,860 | 8/1989 | Achenbach | 364/424.05 |
| 4,861,068 | 8/1989 | McCabe | 280/707 X |
| 4,882,693 | 11/1989 | Yopp | 280/707 X |
| 4,907,154 | 3/1990 | Yasuda et al. | 364/424.05 |
| 4,909,536 | 3/1990 | Hale | 280/707 |
| 4,949,989 | 8/1990 | Kakizaki et al. | 280/707 |
| 4,953,089 | 8/1990 | Wolfe | 364/424.05 |
| 4,967,359 | 10/1990 | Sugasawa et al. | 364/424.05 |
| 4,984,820 | 1/1991 | Uchiyama et al. | 280/707 |
| 4,989,148 | 1/1991 | Gurke et al. | 364/424.05 |
| 5,015,007 | 5/1991 | Uchiyama et al. | 280/707 |
| 5,034,490 | 7/1991 | Sugasawa et al. | 364/424.05 |
| 5,044,660 | 9/1991 | Yamamura et al. | 280/707 |
| 5,072,965 | 12/1991 | Wada et al. | 280/707 |
| 5,088,760 | 2/1992 | Kakizaki et al. | 280/707 |
| 5,090,728 | 2/1992 | Yokoya et al. | 280/707 |
| 5,102,162 | 4/1992 | Okuda et al. | 280/707 |
| 5,127,667 | 7/1992 | Okuda et al. | 280/707 |
| 5,133,574 | 7/1992 | Yamaoka et al. | 280/707 |
| 5,134,566 | 7/1992 | Yokoya et al. | 364/424.05 |
| 5,142,475 | 8/1992 | Matsunaga et al. | 364/424.05 |
| 5,243,525 | 9/1993 | Tsutsumi et al. | 364/424.05 |

FOREIGN PATENT DOCUMENTS

| | | |
|---|---|---|
| 59-227515 | 12/1984 | Japan . |
| 60-151108 | 8/1985 | Japan . |
| 61-18513 | 1/1986 | Japan . |
| 62-80111 | 4/1987 | Japan . |
| 63-6238 | 1/1988 | Japan . |
| 64-67407 | 3/1989 | Japan . |
| 1202177 | 8/1989 | Japan . |
| 2186947 | 8/1987 | United Kingdom . |

| FIG. 7A |
| FIG. 7B |

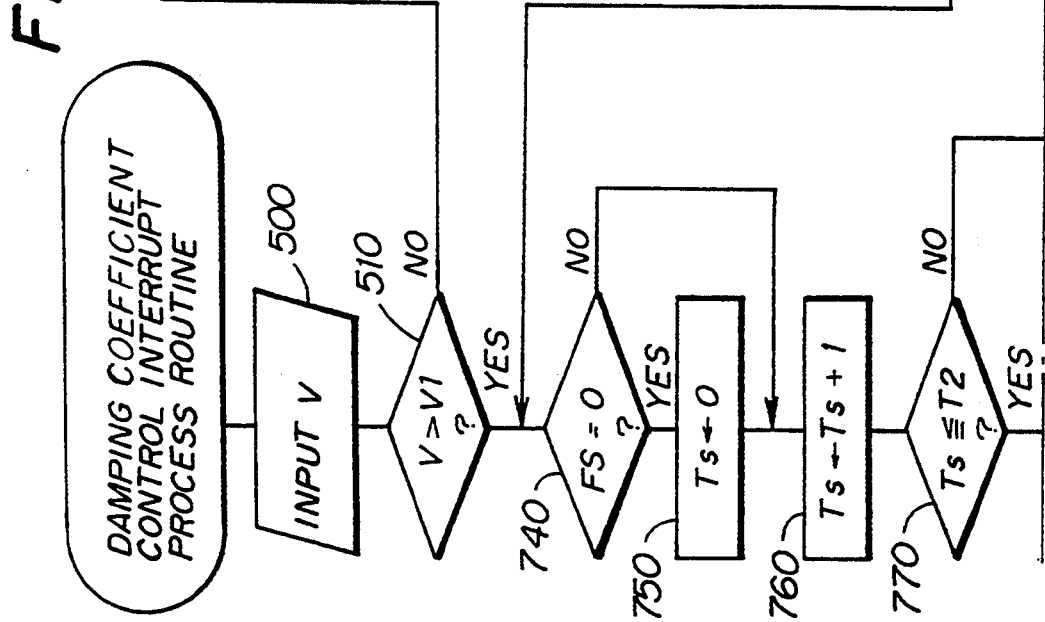
FIG.15A
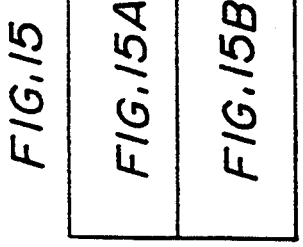
| FIG.15 |
|---|
| FIG.15A |
| FIG.15B |

SUSPENSION CONTROL SYSTEM HAVING DAMPING COEFFICIENT DISCRETELY VARIED RESPONSIVE TO ROAD CONDITIONS

This is a continuation of application Ser. No. 07/622,534, filed Dec. 5, 1990 now abandoned.

BACKGROUND OF THE INVENTION

1. Field of the Invention

The present invention generally relates to a suspension control system, and more particularly to a suspension control system for controlling a damping coefficient of a variable damping coefficient type shock absorber on the basis of a running condition of a vehicle.

2. Description of the Related Art

There is previously known a suspension control system in which the damping coefficient of a shock absorber is controlled on the basis of the rate of change of the damping force. When the change rate of the damping force exceeds a predetermined value, that is, when the change rate changes abruptly due to a rough road surface or braking, the damping coefficient force with respect to a movement of the shock absorber is rapidly changed to a small level, so that the control response characteristic of the shock absorber is improved.

There is also known a suspension control system in which an adjustment reference value provided for the damping force change rate used for changing the setting of the damping coefficient is altered on the basis of a driving condition, such as a vehicle speed, so that ride comfort is improved (see Japanese Laid-Open Patent Application No. 64-67407).

The conventional suspension control system proposed in the above-mentioned Japanese Application has an advantage in that the damping coefficent is rapidly changed in accordance with the road surface condition so that good ride comfort is obtained. However, there is room for improvement in ride comfort in a case where the vehicle is continuously traveling on a rough road surface and thus the damping force change rate frequently changes around the adjustment reference value. In such a case, the setting of the damping coefficient is altered each time the damping force change rate exceeds the adjustment reference value. However, such a setting control of the damping coefficient does not provide good riding comfort, driving controllability and stability. In order to eliminate this problem, conventionally, the setting of the damping coefficient is altered when the damping force change rate exceeds the adjustment reference value and then maintained for a predetermined fixed time period. However, it is very difficult to very reliably control the setting of the damping coefficient in response to the road surface condition by simply maintaining the altered setting of the damping coefficient for the fixed period. For example, the vehicle is traveling on a rough road surface, the damping force change rate changes greatly. Thus, if the fixed period is short, the setting of the damping coefficient will be frequently altered, which deteriorates durability or lifetime of the shock absorber. On the other hand, if the fixed period is long, a problem will occur in which the setting of the damping coefficient unnecessarily maintained in the soft state, for example, after the vehicle rides across a minor stepped road surface portion. In such a case, the road holding ability of the vehicle will deteriorate and driving feeling will also deteriorate.

SUMMARY OF THE INVENTION

It is a general object of the present invention to provide an improved suspension control system in which the above-mentioned disadvantages are eliminated.

A more specific object of the present invention is to provide a suspension control system capable of very reliably controlling the setting of the damping coefficient each shock absorber in response to the road surface condition.

The above-mentioned objects of the present invention are achieved by a suspension control system for controlling a suspension having a shock absorber provided for a wheel of a vehicle, the suspension control system comprising:

damping force change rate detecting means for detecting a damping force change rate indicating a rate of change of a damping force of the shock absorber;

damping coefficient controlling means, coupled to the shock absorber and the damping force change rate detecting means, for altering the setting of the damping coefficient on the basis of a relationship between the damping force change rate and an adjustment reference value;

damping coefficient alteration holding means, coupled to the shock absorber and the damping coefficient controlling means, for continuously maintaining the setting of the damping coefficient at a first level for a holding period after the damping coefficient controlling means alters the setting of the damping coefficient from a second level to the first level less than the second level;

road surface condition judgment means for judging whether or not a road surface on which the vehicle has traveled for the holding period is rough; and holding period correction means, coupled to the damping coefficient alteration holding means and the road surface condition judgment means, for elongating the holding period which is to be supplied to the damping coefficient alteration holding means when the road surface condition judgment means determines that the road surface is rough.

The above-mentioned objects of the present invention are also achieved by a suspension control system for controlling a suspension having a shock absorber provided for a wheel of a vehicle, the suspension control system comprising:

damping coefficient change rate detecting means for detecting a damping force change rate indicating a rate of change of a damping coefficient of the shock absorber;

damping coefficient alteration means, coupled to the shock absorber and the damping force change rate detecting means, for determining whether or not the damping force change rate is outside a first range and for altering the setting of the damping coefficient to a first level from a second level greater than the first level when it is determined that the damping force change rate is outside the first range; and damping force restoration means, coupled to the damping coefficient change rate detecting means, the damping coefficient alteration means and the shock absorber, for determining whether or not the damping force change rate is continuously within a second range narrower than the first range during at least a predetermined period after the damping coefficient alteration means alters the setting of the damping coefficient from the second level to the first level and for restoring the setting of the damping coefficient from the first level to the second level when it is determined that the damping force change rate is continuously within the second range.

The aforementioned objects of the present invention are also achieved by a suspension control system for controlling a suspension having a shock absorber provided for a wheel of a vehicle, the suspension control system comprising:

damping force change rate detecting means for detecting a damping force change rate indicating a rate of change of a damping force of the shock absorber;

damping coefficient alteration means, coupled to the shock absorber and the damping force change rate detecting means, for determining whether or not the damping force change rate is outside a first range and for altering the setting of the damping coefficient to a first level from a second level greater than the first level when it is determined that the damping force change rate is outside the first range;

first damping coefficient restoration means, coupled to the damping force change rate detecting means, the damping coefficient means and the shock absorber, for determining whether or not the damping force change rate is continuously within a second range narrower than the first range during at least a first period after the damping coefficient alteration means alters the setting of the damping coefficient from the second level to the first level and for restoring the setting of the damping coefficient from the first level to the second level when it is determined that the damping force change rate is continuously within the second range;

holding period calculation means, coupled to the damping coefficient alteration means and the first damping coefficient restoration means, for calculating a holding period until the setting of the damping coefficient is restored to the second level by the first damping coefficient restoration means after the setting of the damping coefficient is altered to the first level by the damping coefficient alteration means; and second damping coefficient restoration means, coupled to the holding period calculation means and the shock absorber, for determining whether or not the holding period becomes longer than a second period and for restoring the setting of the damping coefficient from the first level to the second level when it is determined that the holding period becomes longer than the second period.

BRIEF DESCRIPTION OF THE DRAWINGS

Other objects, features and advantages of the present invention will become more apparent from the following detailed description when read in conjunction with the accompanying drawings, in which:

FIG. 15 is a diagram illustrating how to combine FIGS. 15A and 15B;

FIGS. 15A and 15B are flowcharts illustrating the operation of the suspension control system according to the third preferred embodiment of the present invention;

DESCRIPTION OF THE PREFERRED EMBODIMENTS

Figure 1:
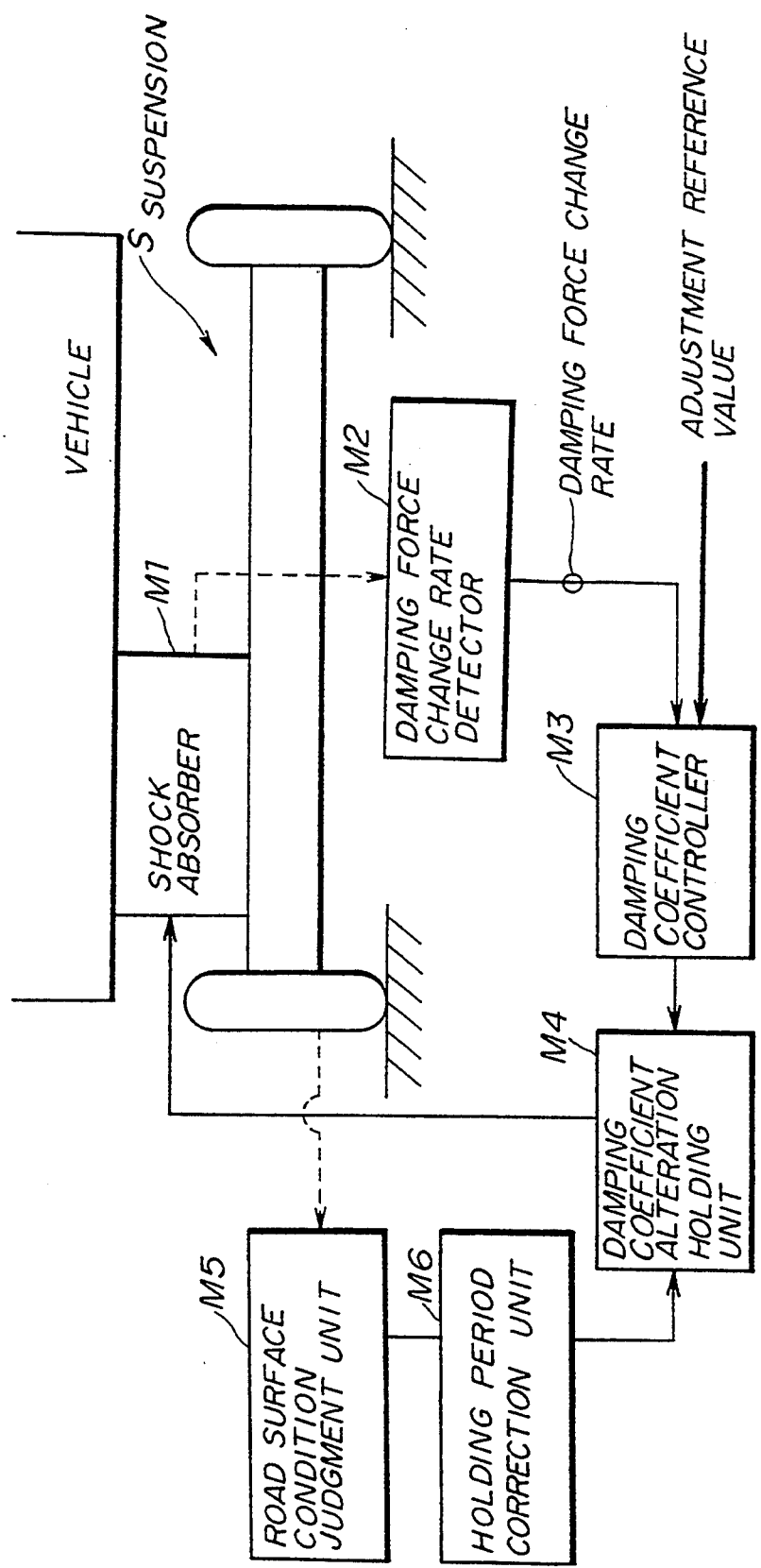
FIG. 1 is a block diagram illustrating the principle of a suspension control system according to a first preferred embodiment of the present invention.

Referring to FIG. 1, there is illustrated the principle of a suspension control system according to a first preferred embodiment of the present invention. A shock absorber M1 is provided in a suspension S of a vehicle and discretely provides different levels of the damping coefficient. A damping coefficient change rate detector M2 detects a rate of change of the damping force of the shock absorber M1. A damping coefficient controller M3 controls the damping coefficient of the shock absorber M1 on the basis of the difference between the damping force change rate and an adjustment reference value provided for adjusting the level of the damping coefficient of the shock absorber M1. For example, when the damping force change rate exceeds the adjustment reference value, the shock absorber M1 is altered to a soft state. A damping coefficient alteration holding unit M4 starts to hold the setting of the damping coefficient for a predetermined holding period when the damping coefficient controller M3 changes the setting of the damping coefficient from a hard state (a high level) to a soft state (a low level). A road surface condition judgment unit M5 judges roughness of a road surface on which the vehicle has traveled for the above-mentioned predetermined holding period. A holding period correction unit M6 adjusts the predetermined holding period on the basis of the judgment result. For example, when the road surface condition judgment unit M5 judges that the road surface is continuously rough, the holding period correction unit M6 lengthens the predetermined holding period.

During operation, the damping force change rate detector M2 detects the damping force change rate. The damping coefficient controller M3 compares the detected damping coefficient change rate with the adjustment reference value. The damping coefficient controller M3 controls the setting of the damping coefficient on the basis of the comparison result. When the damping coefficient controller M3 alters the setting of the damping coefficient from the high level to the low level, the damping coefficient alteration holding unit M4 holds this setting of the damping coefficient for the predetermined holding period. The road surface condition judgment unit M5 judges roughness of the road surface on which the vehicle is traveling for the predetermined holding period in the state where the damping coefficient is set to the low (soft) level. If the road surface condition judgment unit M5 judges that the road surface is not rough, the holding period correction unit M6 executes no correction, so that the setting of the shock absorber M1 is changed to the high (hard) level when the predetermined holing period has elapsed. On the other hand, if the road surface condition judgment period M5 judges that the road surface is rough, the road surface condition judgment unit M5 controls the holding period correction unit M6 so that the predetermined holding period is lengthened during which period the damping coefficient of the such absorber M1 is maintained at the low (soft) level. In the above-mentioned way, the predetermined holding period on which the damping coefficient of the shock absorber M1 is maintained at the low level, is dynamically controlled in accordance with the road surface condition.

It is possible to carry out the above-mentioned suspension control separately for each wheel, or commonly for all the wheels. It is also possible to carry out the suspension control separately for a set of front wheels and a set of rear wheels.

Figure 2:
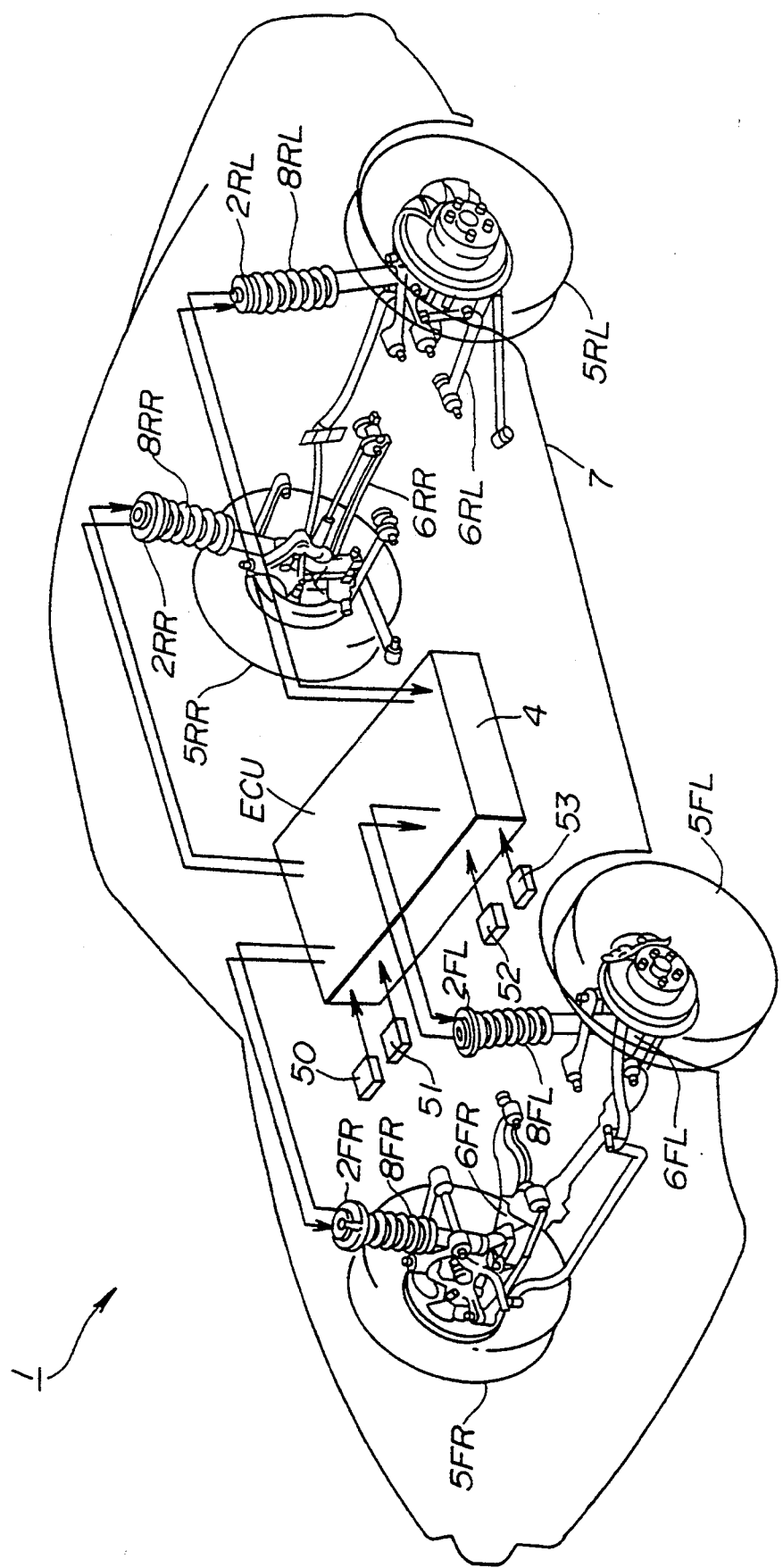
FIG. 2 is a perspective view illustrating a vehicle in which a suspension control system according to the present invention is installed.

A detailed description will now be given of the structure of the first embodiment of the present invention with reference to FIG. 2, which shows that the suspension control system according to the first preferred embodiment of the present invention is applied to variable damping coefficient type shock absorbers 2FL, 2FR, 2RL, 2RR which are suspensions provided in a vehicle 1. The damping coefficient of each of the shock absorbers 2FL, 2FR, 2RL and 2RR is switchable between a first or low level (soft state) and a second or high level (hard state). The shock absorber 2FL is provided between a vehicle body 7 and a suspension lower arm 6FL for a left front wheel 5FL. The shock absorber 2FR is provided between the vehicle body 7 and a suspension lower arm 6FR for a right front wheel 5FR. The shock absorber 2RL is provided between the vehicle body 7 and a suspension lower arm 6RL for a left rear wheel 5RL. The shock absorber 2RR is provided between the vehicle body 7 and a suspension lower arm 6RR for a right rear wheel 5RR. Each of the shock absorbers 2FL, 2FR, 2RL and 2RR includes a built-in piezoelectric load sensor and a piezoelectric actuator pair. The piezoelectric load sensors in the shock absorbers 2FL, 2FR, 2RL and 2RR detect force exerted on the shock absorbers 2FL, 2FR, 2RL and 2RR, respectively. The piezoelectric actuators in the shock absorbers 2FL, 2FR, 2RL and 2RR function to switch the damping forces thereof between the first level and the second level.

A description will now be given of the shock absorbers 2FL, 2FR, 2RL and 2RR. Since all the shock absorbers 2FL, 2FR, 2RL and 2RR have the same structure, only the shock absorber 5FL provided for the left front wheel is described for the sake of convenience. It will be noted that when there is no difference among the four shock absorbers, suffixes such as FL, FR, RL and RR are omitted.

Figure 3A:
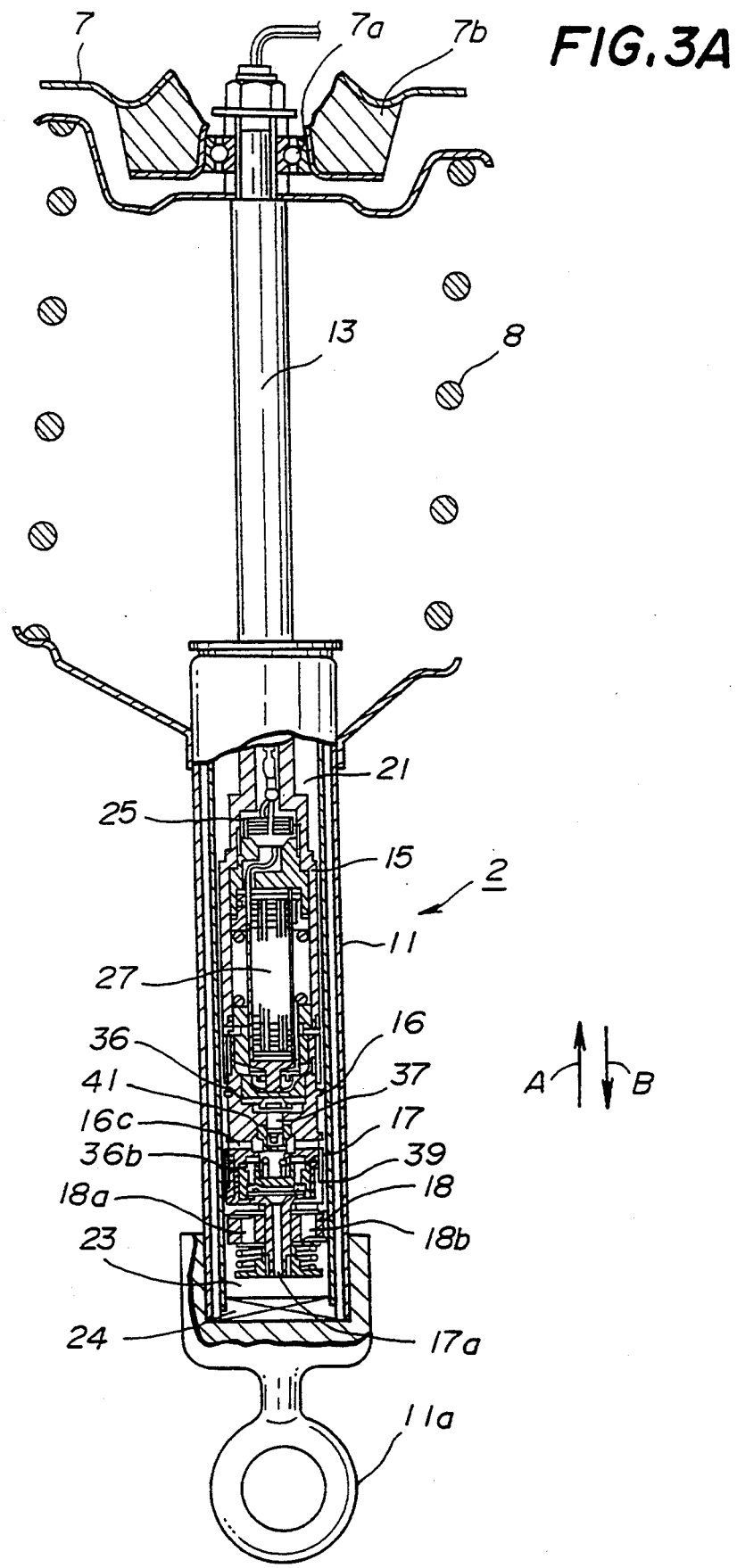
FIG. 3A is a partially sectional view of a shock absorber used in the vehicle shown in FIG. 2.

As shown in FIG. 3A, the shock absorber 2 is fixed to a suspension lower arm 6 through a wheel-shaft-side member 11a at a lower end of a cylinder 11. On the other hand, the shock absorber 2 is fixed, together with a coil spring 8, to the vehicle body 7 through a bearing 7a and a rubber element 7b at an upper end of a rod 13 which penetrates into the cylinder 11. Inside the cylinder 11, there are provided an internal cylinder 15, a connecting member 16 and a cylindrical member 17 which are coupled to the lower end of the rod 13, as well as a main piston 18 which is slidable along an inner surface of the internal cylinder 15. A piezoelectric load sensor 25 and a piezoelectric actuator 27 are accommodated in the internal cylinder 15 connected to the rod 13 of the shock absorber 2.

The main piston 18 is provided outside of the cylindrical member 17 and engages therewith. A seal member 19 is provided between a circumferential outer surface of the main piston 18 and the inner surface of the internal cylinder 15. An internal area of the cylinder 11 is separated into a first liquid room 21 and a second liquid room 23 by the main piston 18. A backup member 28 is provided on the leading end of the cylindrical member 17. The backup member 28 presses a spacer 29 and a leaf valve 30 against the cylindrical member 17 together with the main piston 18. In this state, the spacer 29 and the leaf valve 30 are fixed. A leaf valve 31 and a collar 32 are provided between the backup member 28 and the main piston 18. The leaf valve 31 and the collar 32 are pressed against the backup member 28 and fixed thereto in this state. A main valve 34 and a spring 35 are interposed between the leaf valve 31 and the backup member 28. The main valve 34 and the spring 35 urge the leaf valve 31 toward the main piston 18. A valve 24 selectively connecting a reserver room provided between the internal cylinder 15 and the cylinder 11 is provided on the bottom of the internal cylinder 15.

In a state where the main piston 18 is in a stationary state, the leaf valves 30 and 31 close a expansion-side path 18a and a contraction-side path 18b provided in the main piston 18 on a single side of both the expansion-side path 18a and the contraction-side path 18b. The paths 18a and 18b are opened on respective single sides thereof in accordance with a movement of the main piston 18 indicated by the arrow A or B. Thus, liquid filled in the first and second liquid rooms 21 and 23 passes through one of the paths 18a and 18b so that it moves between the first liquid room 21 and the second liquid room 23. In a state where the movement of liquid between the first liquid room 21 and the second liquid room 23 is limited to the movement between the paths 18a and 18b, a damping force generated with respect to the movement of the rod 13 is great so that the characteristic of the suspension is hard.

Figure 3B:
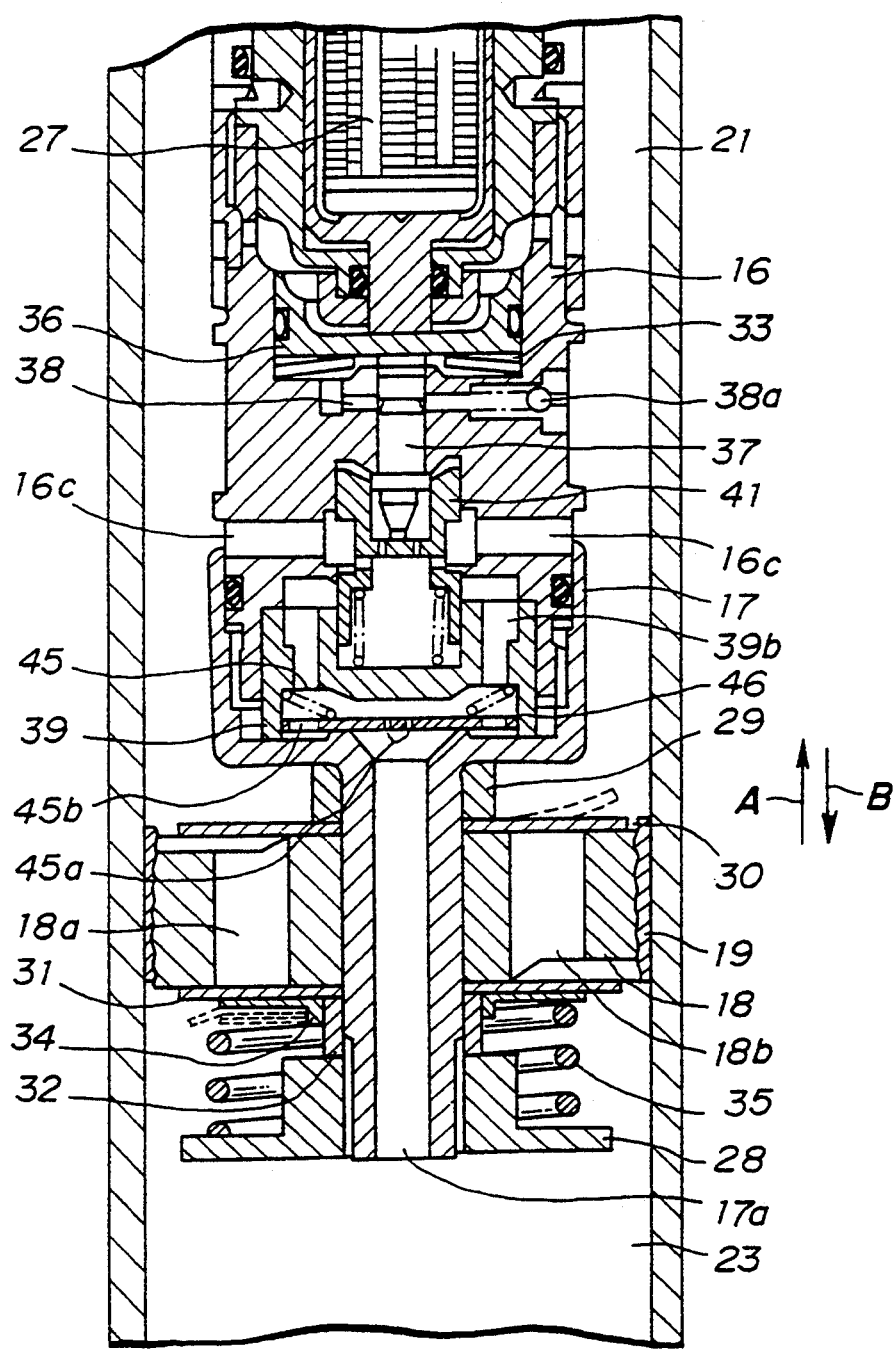
FIG. 3B is an enlarged sectional view of an essential part of the shock absorber shown in FIG. 3A.

As shown in FIGS. 3A and 3B, both the piezoelectric load sensor 25 and the piezoelectric actuator 27 provided inside the connecting member 16 are electrostriction element layered members in which thin plates formed of piezoelectric ceramics are layered through electrodes. In other words, one electrode is elevationally sandwiched between two adjacent thin plates. Each of the piezoelectric thin plates in the piezoelectric load sensor 25 is polarized due to a force generated in the shock absorber 2, that is, a damping force. An electrical output signal from each of the piezoelectric thin films in the piezoelectric load sensor 25 is supplied to an impedance circuit, which generates a voltage signal. Thus, it is possible to obtain a rate of change in the damping force from the voltage signal related to each of the piezoelectric thin films.

The piezoelectric actuator 27 has layered electrostriction elements, each of which expands or contracts with a high response characteristic when a high voltage is applied thereto. The piezoelectric actuator 27 directly drives the piston 36. When the piston is moved in the direction indicated by the arrow B shown in FIG. 3B, a plunger 37 and a spool 41 having a substantially H-shaped cross section are moved in the same direction through the movement of oil in an oiltight room 33. When the spool 41 is moved from the position shown in FIG. 3B (original position) in the direction of the arrow B, a sub liquid path 16c connected to the first liquid room 21 and a sub liquid path 39b of a bush 39 connected to the second liquid room 23 become connected to each other. The sub liquid path 39b further becomes connected to a liquid path 17a in the cylindrical member 17 through an oil hole 45a formed in a plate valve 45. Thus, the movement of the spool 41 in the direction of the arrow B causes an increase in the amount of liquid which is transferred between the first liquid room 21 and the second liquid room 23. That is, when the piezoelectric actuator 27 expands with the high-voltage applied thereto, the shock absorber 2 is altered from the hard state to the soft state. When the piezoelectric actuator 27 is discharged so that no charge is stored therein, the piezoelectric actuator 27 is returned to the hard state.

The degree of movement of the leaf valve 31 provided on the lower surface of the main piston 18 is controlled by the spring 35. An oil hole 45b having a diameter greater than that of the oil hole 45a is formed in the plate valve 45 at a position farther from the center of the plate valve 45 than the oil hole 45a. When the plate valve 45 moves toward the bush 39 against the force by the spring 46, the oil is allowed to move through the oil hole 45b. Thus, the amount of oil obtained when the main piston 18 moves in the direction of the arrow B is greater than that obtained when the main piston 18 moves in the direction of the arrow A, irrespective of the position of the spool 41. That is, the damping coefficient is altered due to the movement direction of the main piston 18 so that the characteristics of the shock absorber can be improved. An oil refilling path 38 is provided together with a check valve 38a between the oiltight room 33 and the first liquid room 21 so that the amount of oil in the oiltight room 33 is fixed. The shock absorber 2 shown in FIGS. 3A and 3B is disclosed in "AUTOMOBILE ENGINEERING MANUAL, FIFTH EDITION", JIDOSHA GIJUTSUKAI, 1983, pp. 4-27 or "TOYOTA CARINA FF NEW MODEL MANUAL", TOYOTA JIDOSHA KABUSHIKI KAISHA, 1985, pp. 4-87.

Figure 4:
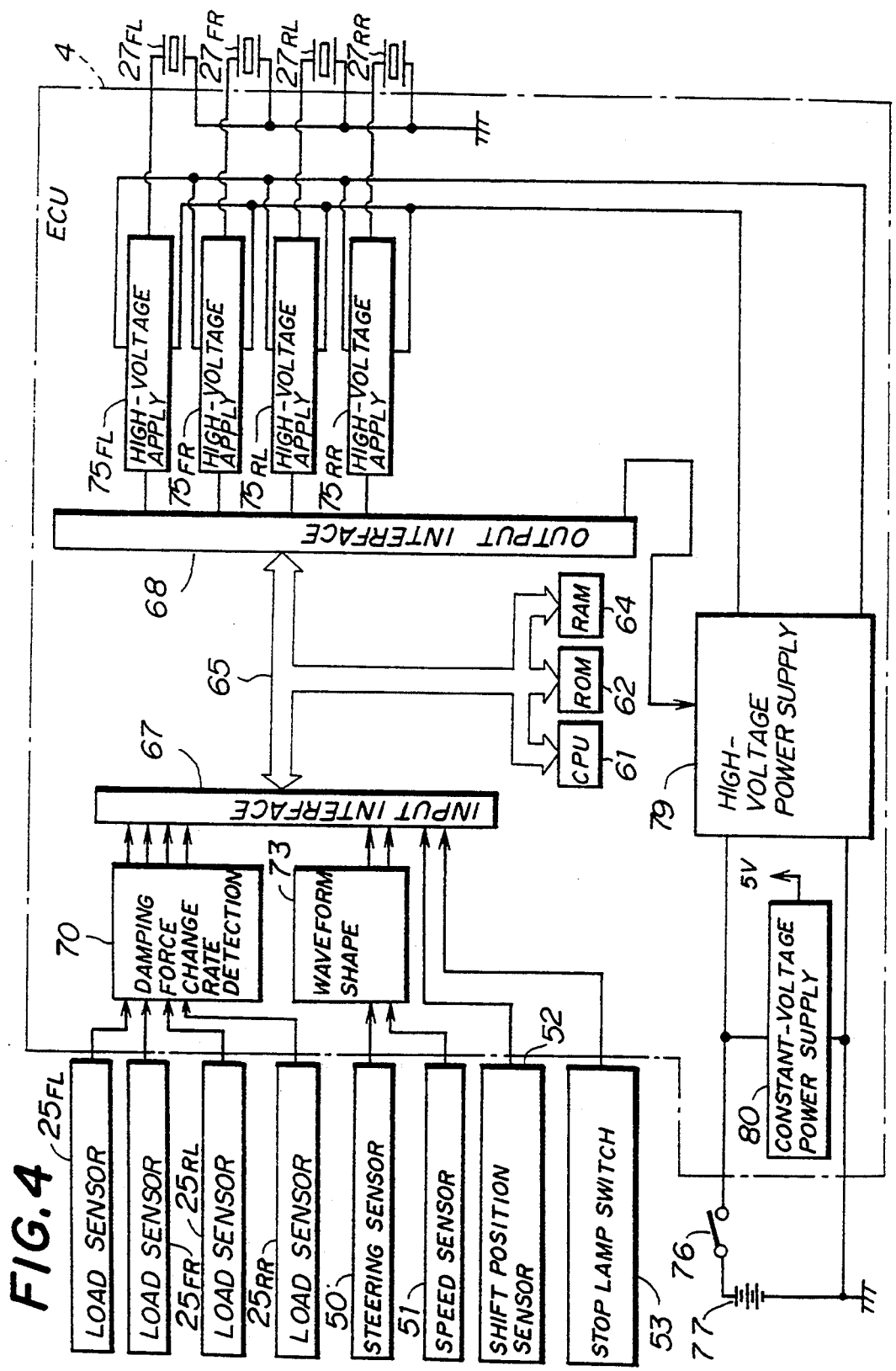
FIG. 4 is a block diagram illustrating a detailed structure of the suspension control system shown in FIG. 1.

A description will now be given of an electronic control unit (hereafter simply referred to as ECU) 4 for switching the damping coefficient of each of the shock absorbers 2 between the first level (soft state) and the second level (hard state) with reference to FIG. 4. In order to detect the driving condition of the vehicle, the following sensors are provided in addition to the piezoelectric load sensors 25FL, 25FR, 25RL and 25RR. A steering sensor 50 detects the steering angle of a steering direction (not shown for the sake of simplicity) and generates a detection signal which indicates the current steering angle. A vehicle speed sensor 51 outputs a series of pulses having a number proportional to the current vehicle speed. A shift position sensor 52 detects the current a current shift position of a change gear (not shown) and generates a detection signal which indicates the current shift position. A stop lamp switch 53 generates a detection signal when a brake pedal is stepped on. The output signals from the above-mentioned sensors are input to the ECU 4. The ECU 4 generates output signals individually supplied to high-voltage application circuits 75FL, 75FR, 75RL and 75RR, which drive the piezoelectric actuators 27FL, 27FR, 27RL and 27RR, respectively.

The ECU 4 includes a central processing unit (hereafter simply referred to as a CPU) 61, a read only memory (ROM) 62 and a random access memory (RAM) 64, all of which are connected to a common bus 65. An input interface circuit 67 and an output interface circuit 68 are connected to the common bus 65.

The ECU 4 further includes a damping force change rate detection circuit 70, a waveform-shaping circuit 73, high-voltage application circuits 75FL, 75FR, 75RL and 75RR, an ignition switch 76, a battery 77, a high-voltage power supply circuit 79 and a constant-voltage power supply circuit 80.

The damping force change rate detection circuit 70 has four detection circuits (not shown) individually provided for the piezoelectric load sensors 25FL, 25FR, 25RL and 25RR. Each of the detection circuits receives the detection signal (a voltage signal V) supplied from the corresponding piezoelectric load sensor 25, and generates an output signal which corresponds to the voltage signal V and which indicates the damping force change rate. As has been described previously, the detection signal from each of the piezoelectric sensors 25FL, 25FR, 25RL and 25RR varies in accordance with a charge amount which is charged into or discharged from each of the piezoelectric thin films. The input interface circuit 67 includes an analog-to-digital converter (not shown), which converts the damping force detection signal in analog form into a digital signal. The waveform shaping circuit 73 shapes the waveforms of the detection signals from the steering sensor 50 and the vehicle speed sensor 51 into a waveform appropriate to signal processing executed by the CPU 61, such as a pulse waveform. The detection signals output by the shift position sensor 52 and the stop lamp switch 53 are input directly to the input interface circuit 67.

The high-voltage application circuits 75FL, 75FR, 75RL and 75RR are electrically connected to the piezoelectric actuators 27FL, 27FR, 27RL and 27RR (FIG. 4), respectively. The high-voltage power supply circuit 79 is of a switching regulator type, and generates high voltages, +500 volts and −100 volts. Each of the high-voltage application circuits 75FL, 75FR, 75RL and 75RR applies a voltage of +500 volts or −100 volts to the corresponding piezoelectric actuator 27 in accordance with a control signal from the CPU 61. When a voltage of +500 volts is applied to the corresponding piezoelectric actuator, it expands. On the other hand, when a voltage of −100 volts is applied to the corresponding piezoelectric actuator, it contracts. Thereby, the oil amount is switched so that the shock absorber 2 is altered to the soft state or the hard state. That is, when the piezoelectric actuator 27 is expanded by the application of a voltage of +500 volts, an increased amount of liquid passes between the first liquid room 21 and the second liquid room 23 in the shock absorber 2 so that the damping coefficient is decreased. On the other hand, when the piezoelectric actuator 27 is contracted by the application of a voltage of −100 volts, a decreased amount of liquid passes between the first liquid room 21 and the second liquid room 23 so that the damping coefficient is increased. The constant voltage power supply circuit 80 converts the voltage of the battery 77 into an operating voltage (5 volts for example).

Figure 5:
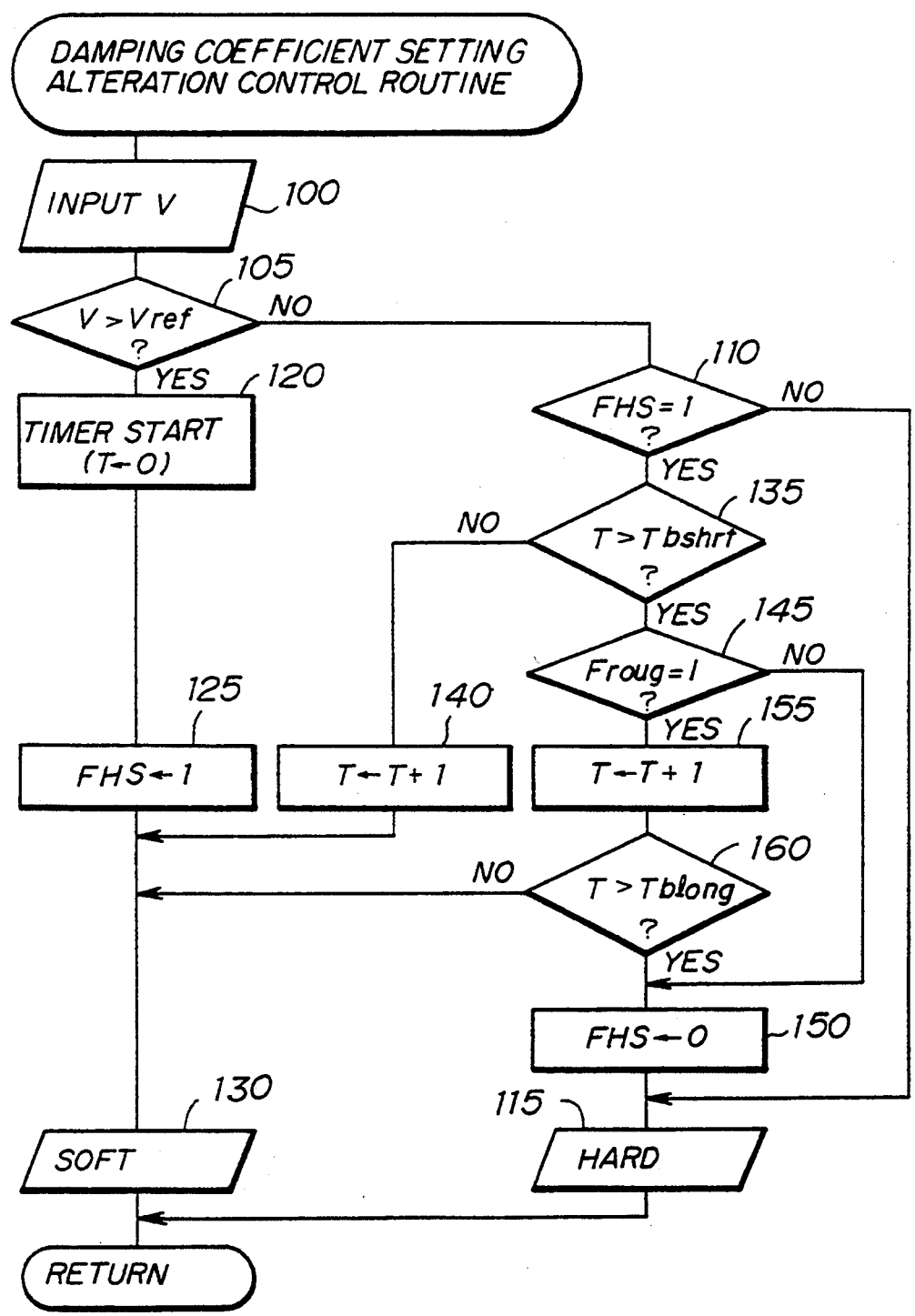
FIGS. 5 and 6 are respectively flowcharts illustrating the operation of the suspension control system according to the first preferred embodiment of the present invention.
Figure 6:
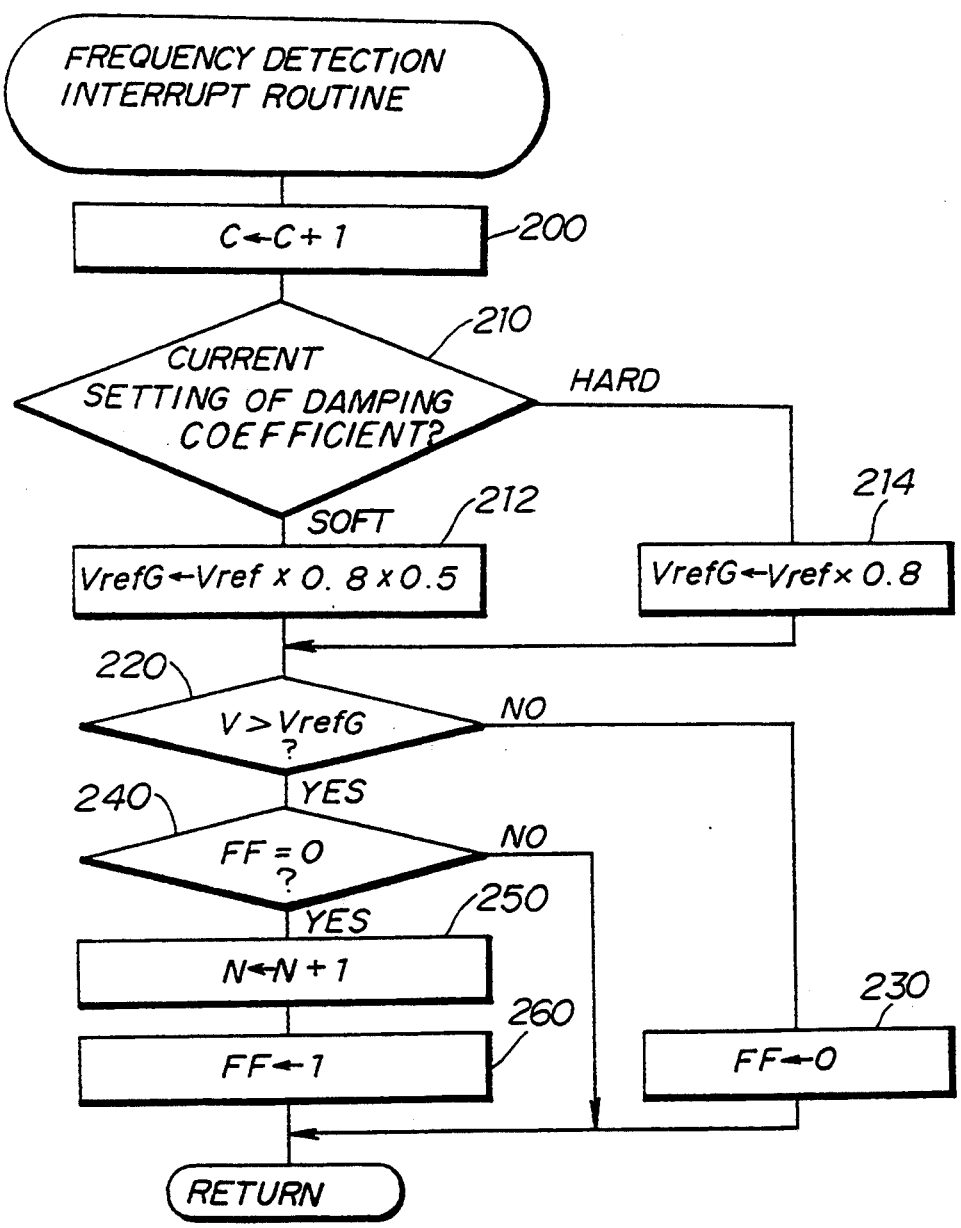
Figure 7:
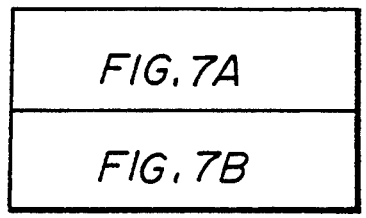
FIG. 7 is a diagram illustrating how to combine FIGS. 7A and 7B.

A description will now be given of a damping coefficient control executed by the suspension control system 1 according to the first preferred embodiment of the present invention, with reference to FIGS. 5, 6 and 7. The procedures shown in FIGS. 5, 6 and 7 are carried out separately for each of the shock absorbers 2FL, 2FR, 2RL and 2RR at predetermined intervals. The following description is related to any one of the shock absorbers 2FL, 2FR, 2RL and 2RR for the sake of simplicity. The other shock absorbers are controlled in the same way.

FIG. 5 illustrates a damping coefficient altering control procedure (routine) for switching the damping coefficient between the low level (soft) and the high level (hard) by changing the status of the piezoelectric actuator 27 on the basis of the damping force change rate V. FIG. 6 illustrates a frequency detection interrupt procedure (routine) for detecting the number of times that the damping force change rate exceeds a learning reference value VrefG within a predetermined period and for outputting, as information on a frequency N, the detected number of times. FIG. 7 illustrates an alteration reference value learning procedure (routine) for learning an alteration reference value Vref used for actually altering the level of the damping coefficient on the basis of the frequency N and for judging roughness of a road surface on which the vehicle has been traveling during a time when the setting of the shock absorber being considered is maintained in the soft state. It will be noted that the alteration reference value Vref corresponds to the aforementioned adjustment reference value.

The procedures shown in FIGS. 6 and 7 learn the alteration reference value Vref (VrefG) by referring to a variable C provided for measuring the predetermined period and the frequency N. The procedure shown in FIG. 5 actually alters the setting of the damping coefficient by using the learned alteration reference value Vref and the judged roughness of the road surface. In addition to FIGS. 5 through 7, the following description will be given with reference to FIG. 8 which illustrates the relationship between the damping force change rate V and the alteration reference value Vref.

Referring to FIG. 5, the procedure commences with step 100, at which step the CPU 61 (FIG. 4) inputs the damping force change rate V regarding each shock absorber 2 from the damping force change rate detection circuit 70 via the input interface circuit 67. Next, at step 105, the CPU 61 discerns whether or not the damping force change rate V is greater than the alteration reference value Vref which is obtained by the learning procedure shown in FIG. 7. When the result at step 105 is NO, that is, when the damping force change rate V is equal to or less than the alteration reference value Vref, the CPU 61 determines, at step 110, whether or not a flag FHS indicating whether or not the suspension is in the soft state is equal to 1. When the result obtained at step 110 is NO, at step 115, the CPU 61 controls the suspension so that it is altered to the hard state, and ends the procedure. It will be noted that immediately after the damping coefficient of the shock absorber 2 is altered from the low level (soft state) to the high level (hard state), the output interface circuit 68 controls the corresponding high-voltage application circuit 75 under the control of the CPU 61 so that a voltage of −100 volts is applied to the corresponding piezoelectric actuator 27 so that it is contracted. If the corresponding piezoelectric actuator 27 is in the contracted state, the piezoelectric actuator 27 is maintained in this state.

On the other hand, when it is determined, at step 105, that the damping force change rate V is greater than the alteration reference value Vref (at time $t_1$ in FIG. 8), the CPU 61 starts a timer variable T at step 120. At step 125 subsequent to step 120, the CPU 61 sets the flag FHS to 1, which represents that the suspension should be set to the soft state. At step 130, under the control of the CPU 61, the output interface circuit 68 controls the corresponding high-voltage application circuit 75 so that it applies a voltage of +500 volts to the corresponding piezoelectric actuator 27 so that the damping coefficient of the shock absorber 2 is set to the low level (soft). Then, the procedure is terminated.

If the damping force change rate V is greater than the alteration reference value Vref after the damping coefficient of the shock absorber 2 is altered to the low level, a sequence of the steps 120, 125 and 130 is repeatedly carried out. When it is determined, at step 105, that the damping force change rate V has become equal to or less than the alteration reference value Vref, the CPU 61 checks the status of the flag FHS at step 110. When FHS=1, the CPU 61 determines, at step 135, whether or not the value of the timer variable T exceeds a predetermined reference value Tbshrt. The reference value Tbshrt is provided for maintaining the shock absorber 2 at the low (soft) level for at least a predetermined time after it is altered to the low level. If the value of the timer variable T is equal to or less than the reference value Tbshrt, the CPU 61 increments the value of the timer variable T by +1 at step 140, and executes step 130. Thus, the suspension is maintained in the soft state.

After that, if the damping force change rate V exceeds the alteration reference value Vref (at time $t_2$ shown in FIG. 8), the steps 120, 125 and 130 are successively carried out.

Figure 8:
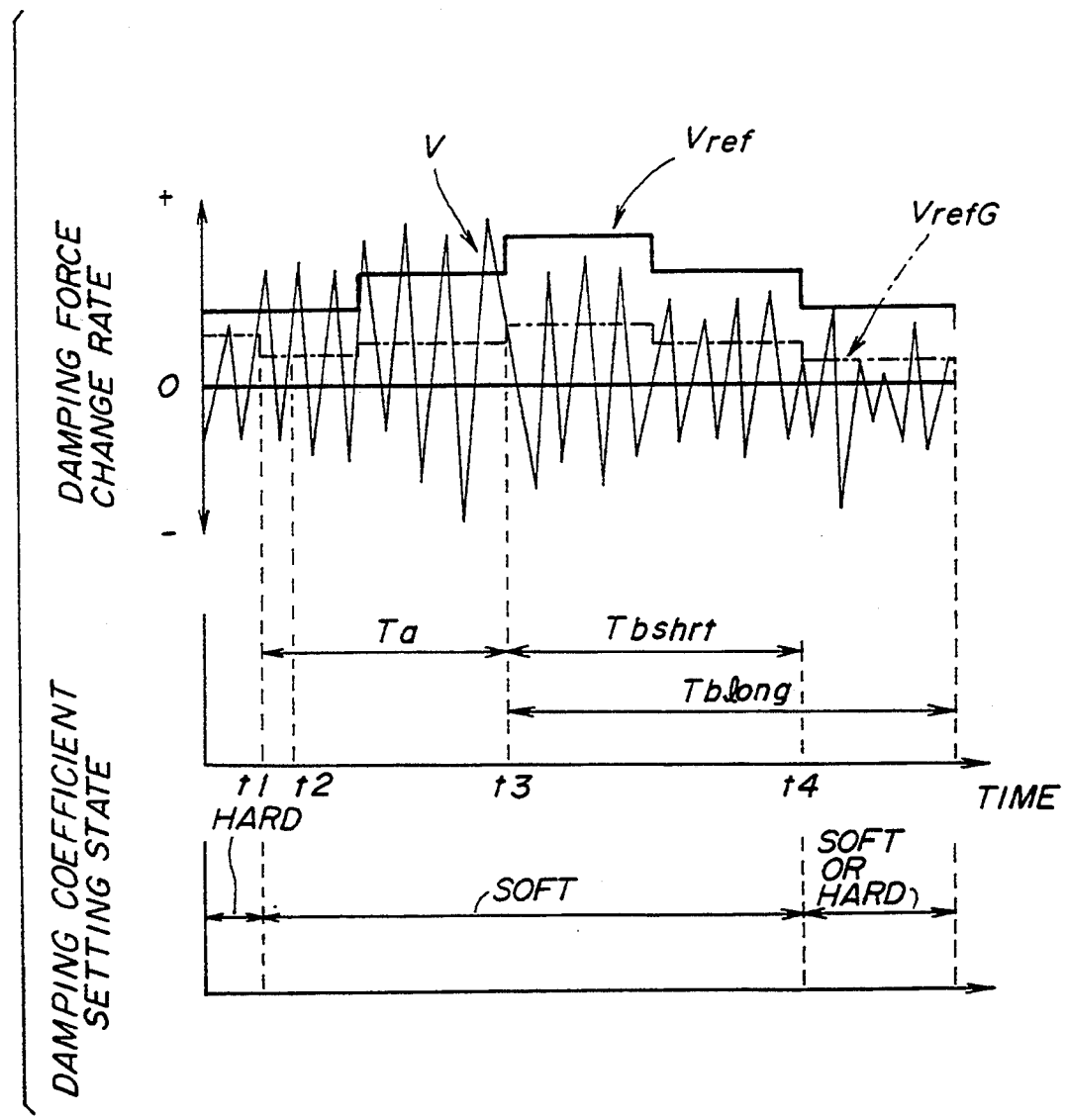
FIG. 8 is a diagram illustrating the relationship between a damping force change rate and the state of a shock absorber according to the first preferred embodiment of the present invention.

The result obtained at step 135 becomes YES, when the damping force change rate V is not in excess of the alteration reference value Vref during a predetermined period (which corresponds to the reference value Tbshrt) from the time when the damping force change rate V becomes equal to or less than the alteration reference value Vref after the damping coefficient of the shock absorber 2 is altered to the low level (time $t_1$ shown in FIG. 8). The damping force change rate V does not exceed the alteration reference value Vref during the period between time $t_3$ and $t_4$ shown in FIG. 8. When the result obtained at step 135 is YES, the CPU 61 carries out step 145, at which step it is determined whether or not a flag Froug is equal to 1. The flag Froug indicates whether or not a road surface is rough on which the vehicle has traveled during a hold time when the damping force of the shock absorber 2 is maintained at the low level. In FIG. 8, the hold time corresponds to the sum total of the period between time $t_3$ and $T_4$ and Tbshrt. Hereafter, the period between time $t_1$ and time $t_3$ in FIG. 8 is referred to as Ta.

The flag Froug is controlled by the routine shown in FIG. 7 in which the road surface condition on which the vehicle has traveled for the hold time (Ta+Tbshrt) is judged. When it is determined that the road surface is rough, the flag Froug is set to 1.

When it is determined, at step 145, that the flag Froug is equal to 0, the CPU 61 resets the flag FHS to 0 at step 150, so that the setting of the damping coefficient of the shock absorber 2 is altered to the high (hard) level at step 115. That is, when the road surface on which the vehicle has traveled for the hold time (Ta+Tbshrt) is not rough, the damping coefficient of the shock absorber 2 is maintained in the soft state during the hold time (Ta+Tbshrt).

On the other hand, when it is determined, at step 145, that the flag Froug is equal to 1, the timer variable T is incremented by 1 at step 155. After that, at step 160, the CPU 61 compares the value of the timer variable T with a reference value Tblong which is longer than the aforementioned reference value Tbshrt. When it is determined, at step 160, that T≦Tblong, the damping coefficient of the shock absorber 2 is maintained at the low level at step 130, and the procedure shown in FIG. 5 is ended.

The reference value Tblong is provided for elongating the period during which the damping coefficient of the shock absorber 2 is maintained at the low level if the road surface on which the vehicle has traveled for the hold time (Ta+Tbshrt) is rough. That is, the reference value Tblong is provided for elongating the holding period by a period (Tblong−Tbshrt) during which the damping coefficient of the shock absorber is continuously maintained at the low level.

When it is determined, at step 155, that the value of the timer variable T exceeds the reference value Tblong, the CPU 61 resets the flag FHS to zero at step 150, so that the damping coefficient of the shock absorber 2 is maintained at the high level at step 115. That is, the damping coefficient of the shock absorber 2 is altered to the high level when the time (Ta+Tblong) has elapsed from the time when it is altered to the low level (at time $t_1$ shown in FIG. 8).

In the above-mentioned way, the procedure shown in FIG. 5 is repeatedly carried out, for example, separately for each wheel. When the damping force change rate V related to the shock absorber 2 being considered exceeds the alteration reference value Vref (at time $t_1$ shown in FIG. 8), the damping coefficient of the shock absorber 2 is immediately set to the low level. During the period between time $t_1$ and $t_4$ in FIG. 8, that is, the holding period (Ta and +Tbshrt), the damping coefficient of the shock absorber 2 is maintained at the low level. If the road surface on which the vehicle has traveled for the hold time (Ta+Tbshrt) is not rough, the setting of the the damping coefficient is altered to the high level (hard state). On the other hand, if the road surface is rough on which the vehicle has traveled for the hold time (Ta+Tbshrt), the damping coefficient of the shock absorber 2 is continuously maintained at the low level for the period (Tblong−Tbshrt) after the elapse of the hold time (Ta+Tbshrt). After that, the setting of the damping coefficient is altered to the high level.

A description will now be given of the alteration frequency detection routine shown in FIG. 6. The procedure shown in FIG. 6 calculates a frequency N which indicates the number of times that the damping force change rate V exceeds a learning reference value VrefG for a predetermined period. The frequency N is used for determining the alteration reference value Vref and controlling the aforementioned flag Froug.

The procedure shown in FIG. 6 commences with step 200, at which step the CPU 61 increments the aforementioned variable C by +1. The variable C indicates the number of times that the procedure shown in FIG. 6 is executed. At subsequent step 210, the CPU 61 discerns whether the suspension is in the soft state or hard state. It will be noted that the setting of the damping coefficient of the shock absorber 2 is controlled by the aforementioned procedure shown in FIG. 5. When it is determined, at step 210, that the current status of the shock absorber 2 is in the low level (soft state), at step 212, the CPU 61 multiplies the current alteration reference value Vref by 0.8×0.5 and inserts Vref×0.8×0.5 into the learning reference value VrefG. On the other hand, when it is determined, at step 210, that the current status of the shock absorber 2 is in the high level (hard state), at step 214, the CPU 61 multiplies the current alteration reference value Vref by 0.8 and inserts Vref×0.8 into the learning reference value VrefG. The above-mentioned coefficients to be multiplied by the alteration reference values are not limited to 0.8×0.5 and 0.8, but arbitrarily selected on the basis of experimental results.

After the learning reference value VrefG is obtained for each of the hard and soft states in the above-mentioned way, the CPU 61 determines, at step 220, whether or not the current damping force change rate V is greater than the learning reference value VrefG. If the current damping force change rate V is equal to or lower than the learning reference value VrefG, the CPU 61 resets a flag FF to zero at step 230, and then ends the procedure shown in FIG. 6. The flag FF indicates whether or not the current damping force change rate V is greater than the alteration reference value Vref.

On the other hand, when it is determined, at step 220, that the current damping force change rate V is greater than the learning reference value VrefG, the CPU 61 checks the value of the flag FF at step 240. When it is determined, at step 240, that the flag FF is equal to zero, that is, immediately after the current damping force change rate V has become greater than the learning reference value VrefG, the CPU 61 increments the frequency N by +1 at step 250, and then sets the flag FF to 1 at step 260. Then, the procedure shown in FIG. 6 is ended. In this manner, the frequency N is incremented by +1 only immediately after the damping force change rate V has become greater than the learning reference value VrefG. That is, the frequency N is not increased until the damping force change rate V becomes equal to or less than the alteration reference value VrefG and then becomes greater than the alteration reference value VrefG again.

The procedure shown in FIG. 6 is repeatedly carried out so that the learning reference value VrefG is renewed on the basis of the alteration reference value Vref, and the frequency N at which the damping force change rate V becomes greater than the learning reference value VrefG within the predetermined period is obtained.

The alteration reference value learning procedure and a procedure for controlling the flag Froug will now be explained with reference to FIGS. 7A and 7B. The procedure shown in FIG. 7A commences with step 300, at which step the CPU 61 inputs the signals from the steering sensor 50, the speed sensor 51 and the stop lamp switch 53 via the input interface circuit 67. At subsequent step 310, the CPU 61 obtains the current driving condition from the input signals, and determines, from the obtained current driving condition, whether or not a special control, such as an anti-dive control or an anti-roll control, should be carried out. For example, when the vehicle is being braked or rapidly turned, the CPU 61 concludes that the special control should be carried out. In this case, the CPU 61 changes the alteration reference value Vref to an optimum value suitable for the special control at step 315. After that, the procedure shown in FIGS. 7A and 7B is ended.

On the other hand, when it is determined, at step 310, that the above-mentioned special control is not needed, the CPU 61 determines, at step 320, whether or not the variable C has become equal to a value i. The variable C is incremented by +1 each time the procedure shown in FIG. 7 is executed. The variable C is provided for determining whether or not the (predetermined) time necessary to obtain the frequency N has elapsed. The procedure shown in FIG. 7A and 7B is ended if the number of times that the procedure shown in FIG. 7 has repeatedly been carried out is small (C<i), so that the time necessary to obtain the frequency N has not yet elapsed.

Figure 9:
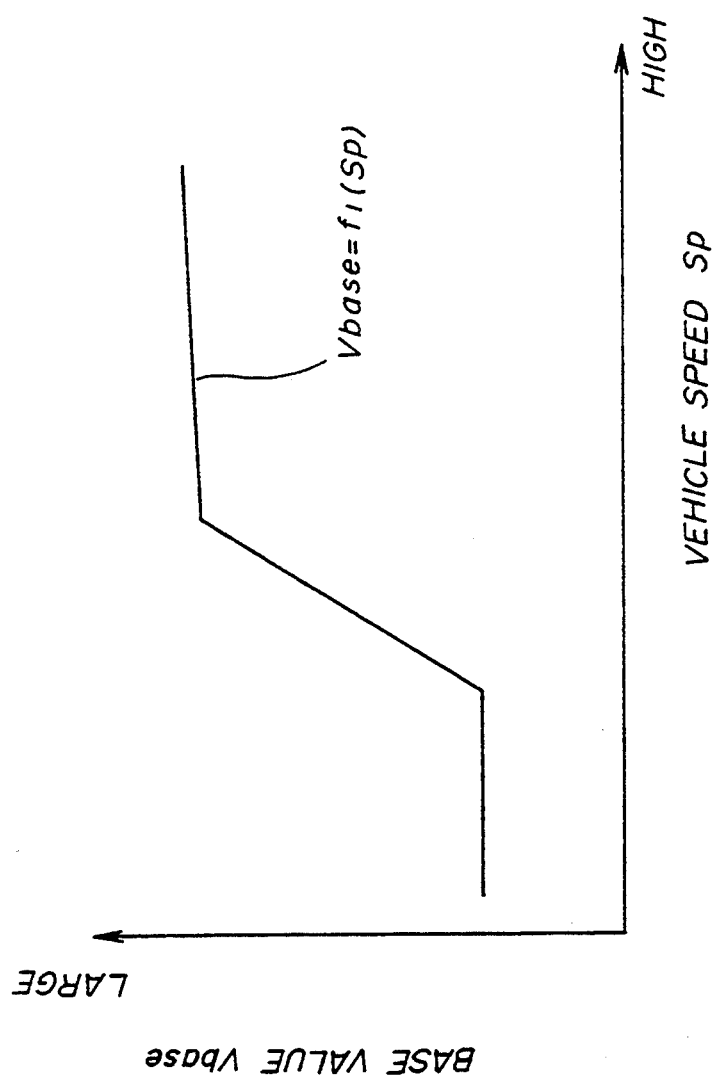
FIG. 9 is a graph illustrating the relationship between a base value of a reference value and a vehicle speed.

The determination result at step 320 becomes YES each time the procedure shown in FIG. 7 is carried out i times. When the result at step 320 is YES, the CPU 61 resets the variable C to zero at step 330, and inputs a current vehicle speed Sp via the input interface circuit 67 at step 340. At step 350, the CPU 61 calculates a base value Vbase from the vehicle speed Sp. The base value Vbase is used for adjusting the alteration reference value Vref in accordance with the vehicle speed Sp. As shown in FIG. 9, the base value Vbase is a function of the vehicle speed Sp, $f_1(Sp)$. As also shown in FIG. 9, the base value Vbase is increased with an increase in the vehicle speed Sp.

Figure 7A:
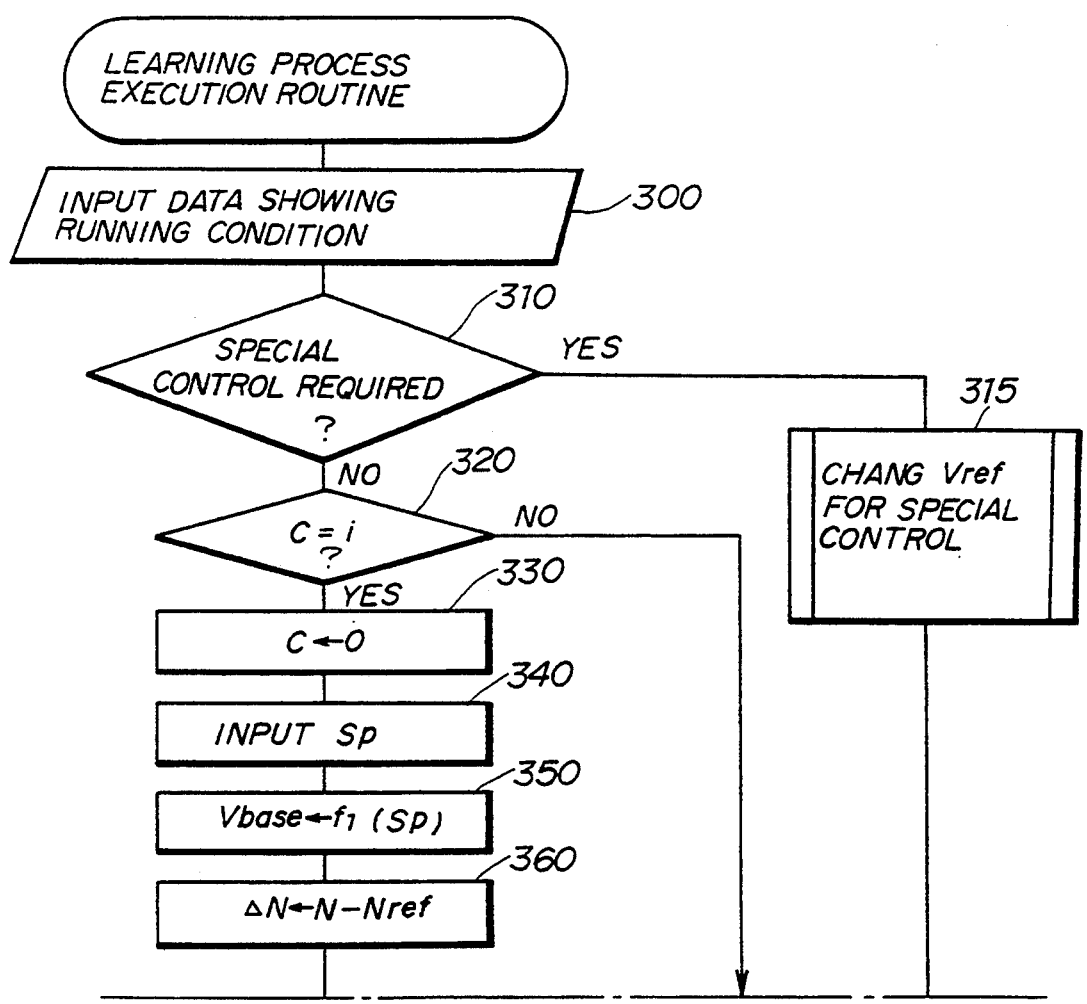
FIGS. 7A and 7B are flowcharts illustrating the operation of the suspension control system according to the first preferred embodiment of the present invention.
Figure 7B:
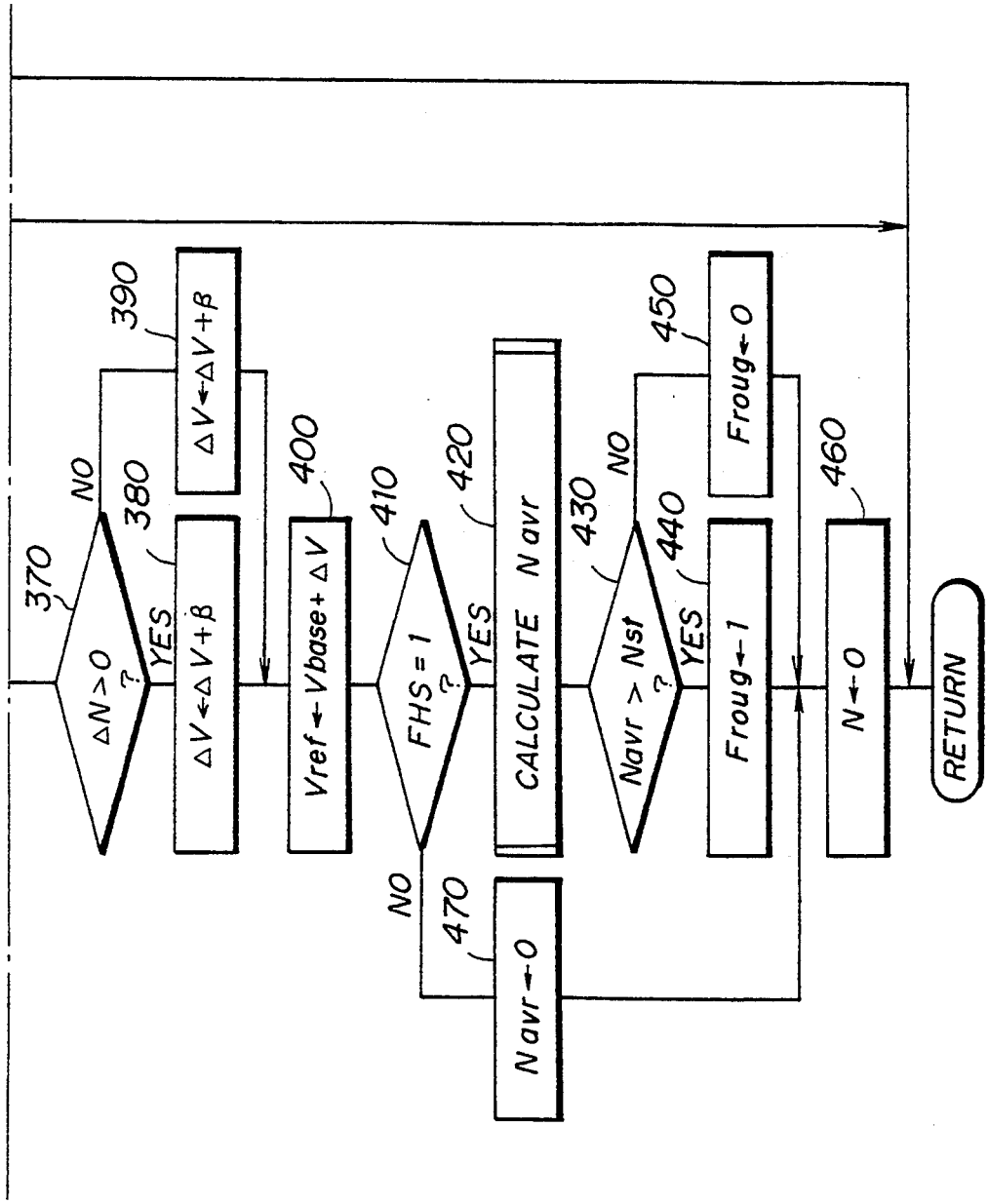

Turning now to FIG. 7A, at step 360, the CPU 61 calculates a frequency deviation $\Delta N$ between the frequency N obtained by the procedure shown in FIG. 6 and a target frequency Nref. At step 370 in FIG. 7B, the CPU 61 discerns whether or not the frequency deviation $\Delta N$ is greater than 0. When the frequency deviation $\Delta N$ is greater than 0, a learning correction value $\Delta V$ is incremented by $\beta$ at step 380. On the other hand, when the frequency deviation $\Delta N$ is equal to or less than 0, the learning correction value $\Delta V$ is decremented by $\beta$ at step 390. The learning correction value $\Delta V$ thus calculated is added to the base value Vbase at step 400 so that the alteration reference value Vref is obtained. In this way, the alteration reference value Vref is learned and adjusted on the basis of the vehicle speed Sp. It will be noted that the learning correction value $\Delta V$ is also learned and the learning correction value $\Delta V$ obtained by the learning is stored in the RAM 64, for example, and used in the future control.

The CPU 61 discerns whether or not FHS=1 at step 410. When FHS=1, that is, the shock absorber 2 is in the soft state, the CPU 61 starts a procedure which starts from step 420 and which judges roughness of the road surface on which the vehicle has traveled. At step 420, the CPU 61 calculates an average Navr of the frequencies N which have been obtained by repeatedly carrying out the procedure shown in FIG. 6 until the present from the time when the damping coefficient of the shock absorber 2 is altered to the low level (time $t_1$ shown in FIG. 8). At step 430 subsequent to step 420, the CPU 61 determines whether or not the average frequency Navr is greater than a reference frequency value Nst. The reference frequency value Nst is provided for judging that the road surface is rough on which the vehicle has traveled during a period between time $t_1$ and a time when the present procedure is executed (that is, a period between a time when the procedure is executed for obtaining the first one of the frequencies N necessary to calculate the average frequency Navr and a time when the procedure is executed for obtaining the last one of the frequencies N).

When it is determined, at step 430, that the average frequency Navr is greater than the reference frequency value Nref, the CPU 61 sets the flag Froug to 1 at step 440. On the other hand, the result at step 430 is NO, the CPU 61 resets the flag Froug to zero at step 450.

After that, at step 460, the CPU 61 resets the frequency N to zero in order to be ready for the next frequency detection procedure. If it is determined, at step 410, that the shock absorber 2 is in the hard state, the CPU 61 resets the average frequency Navr to zero at step 470. When the shock absorber 2 is in the hard state, it is not necessary to refer to the flag Froug and obtain the average frequency value Vavr. By executing the procedure shown in FIGS. 7A and 7B, the alteration reference value Vref is determined on the basis of the vehicle speed Sp, and learned on the basis of the frequency N.

By comparing the average frequency Navr with the reference frequency value Vst, it is possible to judge roughness of the road surface on which the vehicle has traveled until the time when the present routine (FIGS. 7A and 7B) is executed from the time when the damping force of the shock absorber 2 is altered to the low level (at time $t_1$ in FIG. 8), and to show the judgment result by using the value of the flag Froug (which is equal to 1 when the road surface is rough). This is due to the fact that the frequency deviation $\Delta N$ increases as roughness of the road surface becomes great, so that the average frequency Navr becomes greater than the reference frequency value Nst. As a result, by referring to the flag Froug immediately after the elapse of the holding period (Ta+Tbshrt), it is possible to judge whether or not the road surface is rough on which the vehicle has traveled for the above holding period. In other words, by referring to the flag Froug in the damping coefficient alteration control procedure shown in FIG. 5, it becomes possible to judge roughness of the road surface on which the vehicle has traveled between time $t_1$ and time $t_4$.

By carrying out the procedures shown in FIGS. 5, 6, 7A and 7B, the damping coefficient of the shock absorber 2 of the suspension is maintained at the low level without exception during the holding period (Ta+Tbshrt where Ta denotes the period between the time when the damping force change rate V exceeds the alteration reference value Vref (time $t_1$ in FIG. 8) and the time from which the damping force change rate V is continuously equal to or less than the alteration reference value Vref. When it is judged that the road surface is rough on which the vehicle has traveled for the holding period (Ta+Tbshrt), it is concluded that there is a high possibility that the road surface is continuously rough. Thus, the period on which the damping coefficient is maintained at the low level is elongated by the time (Tblong−Tbshrt).

With the above-mentioned damping coefficient control, it becomes possible to very reliably control the setting of the damping coefficient in accordance to the road surface condition. That is, the following advantages are obtained according to the present invention.

The damping coefficient of the shock absorber 2 is altered to the high level immediately after the elapse of the holding period (Ta+Tbshrt) when the road surface is not rough on which the vehicle has traveled from the above holding period which starts from the time when the damping coefficient of the shock absorber 2 is altered to the low level from the high level. Thus, when the vehicle has traveled on a road surface which is not rough, the setting of the shock absorber 2 is maintained in the soft state during a relatively short period (which corresponds to (Ta+Tbshrt) and then returned to the hard state. Thus, good riding comport and road holding properties are obtained.

On the other hand, when the vehicle is continuously traveling on a rough road surface, it is determined that the road surface is rough during the holding period (Ta+Tbshrt). Thus, the holding period is elongated. Thus, it is possible to prevent the setting of the damping coefficient from being unnecessarily altered and to thus provide improved driving feeling and durability of the shock absorber 2.

According to the above-mentioned embodiment of the present invention, the judgment at step 105 shown in FIG. 5 is carried out for not only the period Ta but also Tbshrt. Thus, the judgment results greatly reflects the road surface condition obtained from the time when the damping coefficient is altered to the low level and the time when it is judged whether or not the holding period should be elongated. As a result, it becomes possible to very reliably control the setting of the damping coefficient in response to the road surface condition.

Further, each suspension is controlled by using the alteration reference value Vref as follows. When the vehicle is running on a flat road surface, the damping force change rate V does not change greatly, and the damping coefficient of the shock absorber 2 is maintained at the high level (hard state). At this time, the learning reference value VrefG is equal to 80% of the alteration reference value Vref at step 214 shown in FIG. 6. Thus, the frequency N at which the damping force change rate V exceeds the learning reference value VrefG within the predetermined period (which corresponds to the count value i) is low. Thus, the alteration reference value Vref is learned at step 390 (FIG. 7B) so that it is decremented by $\beta$ each time it is determined that $\Delta N \leq 0$ at step 370 shown in FIG. 7B. As a result, it becomes easy for the damping force change rate V to exceed the alteration reference value Vref. Thus, the damping coefficient of the shock absorber 2 is altered to the low level due to the presence of a minor road surface roughness, even when the vehicle is traveling on the flat road surface. As the alteration reference value Vref becomes small at step 212 (FIG. 6), the learning reference value VrefG also becomes small, so that the frequency N at which the damping force change value V exceeds the learning reference value VrefG within the predetermined period becomes high. As a result, the alteration reference value Vref is incremented by $+\beta$. As the above-mentioned procedure is repeatedly carried out, the alteration reference value Vref is learned so that it becomes equal to an appropriate value at which the frequency deviation $\Delta N$ becomes approximately zero.

Thus, when the vehicle is traveling on the flat road surface and the damping force change rate V is low so that the suspension has a tendency to be set to the hard state, the alteration reference value Vref is gradually decreased by the detection of the frequency N, the renewal of the alteration reference value Vref and the learning of the learning reference value VrefG. As a result, it becomes easy to alter the damping coefficient of the shock absorber 2 to the low level, that is, alter the suspension to the soft state. Thus, it becomes possible to absorb a vibration caused by minor roughness on a continuously flat road surface, so that riding comfort is improved.

On the other hand, when the vehicle is traveling on a rough road surface, the damping force change rate V changes greatly and the suspension is maintained in the soft state. During this time, the learning reference value VrefG is set equal to 40% of the alteration reference value Vref at step 212 shown in FIG. 6. Thus, the frequency N at which the damping force change rate V exceeds the alteration reference value Vref within the predetermined period (which corresponds to the count value i) is high. As a result, the alteration reference value Vref is incremented by $\beta$ at step 380 each time it is determined that $\Delta N > 0$. Thus, it gradually becomes difficult for the damping force change rate V to exceed the alteration reference value Vref, so that the damping coefficient is altered to the high level (hard state), even when the vehicle is traveling on the rough road surface. As the alteration reference value Vref is increased in the above-mentioned way, the learning reference value VrefG is also increased. Thus, the frequency N at which the damping force change rate V exceeds the learning reference value VrefG becomes low. As a result, the alteration reference value Vref is renewed so that it is decreased by $\beta$. As the above-mentioned procedure is repeatedly carried out, the alteration reference value Vref is learned so that it becomes equal to an appropriate value at which the frequency deviation $\Delta N$ is approximately zero.

Thus, even when the vehicle is traveling on the rough road surface and the damping force change rate V is high so that the suspension has a tendency to be set to the hard state, the alteration reference value Vref is gradually increased in accordance with the detection of the frequency N, the renewal of the alteration reference value Vref and learning of the learning reference value VrefG. As a result, it becomes easy to alter the damping coefficient of the shock absorber 2 to the high level, that is, alter the suspension to the hard state. Thus, it becomes possible to reduce deterioration of the road holding characteristic caused by a continuously rough road surface, so that driving stability and controllability can be improved.

Figure 10:
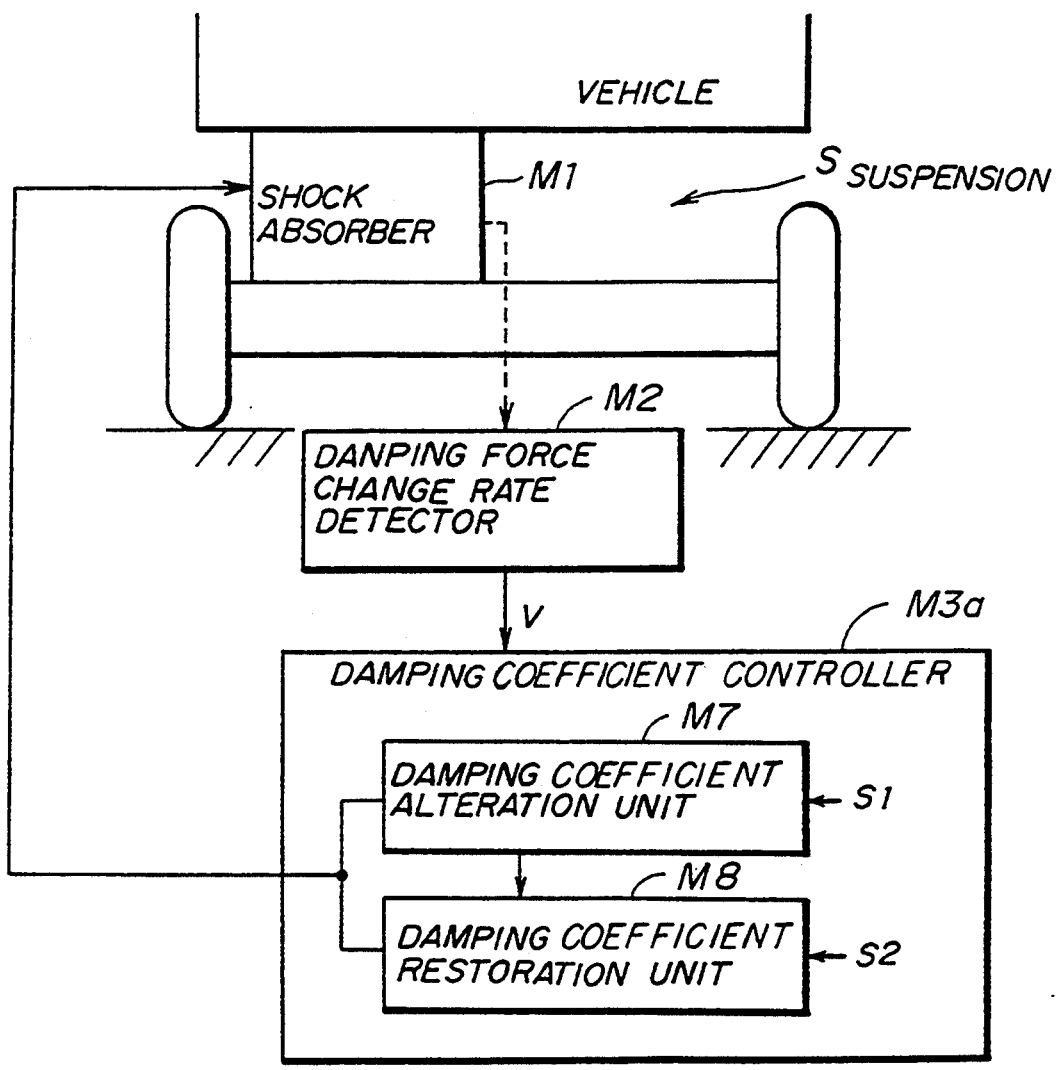
FIG. 10 is a block diagram illustrating a suspension control system according to a second preferred embodiment of the present invention.

A description will now be given of a second preferred embodiment of the present invention. Referring to FIG. 10, there is illustrated the principle of a suspension control system according to the second preferred embodiment of the present invention. In FIG. 10, those parts which are the same as those shown in FIG. 1 are given the same reference numerals.

The suspension control system shown in FIG. 10 is composed of the damping force change rate detector M2, and a damping coefficient controller M3a, which is composed of a damping coefficient alteration unit M7 and a damping coefficient restoration unit M8. The damping coefficient alteration unit M7 is supplied with a first reference value S1, and the damping coefficient restoration unit M8 is supplied with a second reference value S2. The damping coefficient alteration unit M7 determines whether or not the damping force change rate V output by the damping force change rate detector M2 is outside a range defined by the first reference value S1. As shown in FIG. 8, the damping force change rate V is represented by a signal which has either a positive or negative polarity. Thus, the range defined by the first reference value S1 is between the negative first reference value S1 and the positive reference value S1. Alternatively, when the signal representing the damping force change rate V is filtered so that the damping force change rate V is represented in the form of absolute value, the first reference value S1 is the positive value.

When it is determined that the damping force change rate V is outside the range defined by the first reference value S1, the damping coefficient alteration unit M7 controls the shock absorber M1 so that the setting of the damping coefficient is altered from the high level to the low level. The damping coefficient restoration unit M8 determines whether or not the damping force change rate V is continuously within a range defined by the second reference value S2 during a predetermined period after the damping coefficient is altered to the low level by the damping coefficient alteration unit M4. The range defined by the second reference value S2 is narrower than that defined by the first reference value S1. When it is determined that the damping force change rate V is continuously within the range defined by the second reference value S2 during the predetermined period, the damping coefficient restoration unit M8 controls the shock absorber M1 so that the setting of the damping coefficient provided thereby is restored to the high level (hard state).

It is possible to carry out the above-mentioned suspension control separately for each wheel, or commonly for all the wheels. It is also possible to carry out the suspension control separately for a set of front wheels and a set of rear wheels.

Figure 11:
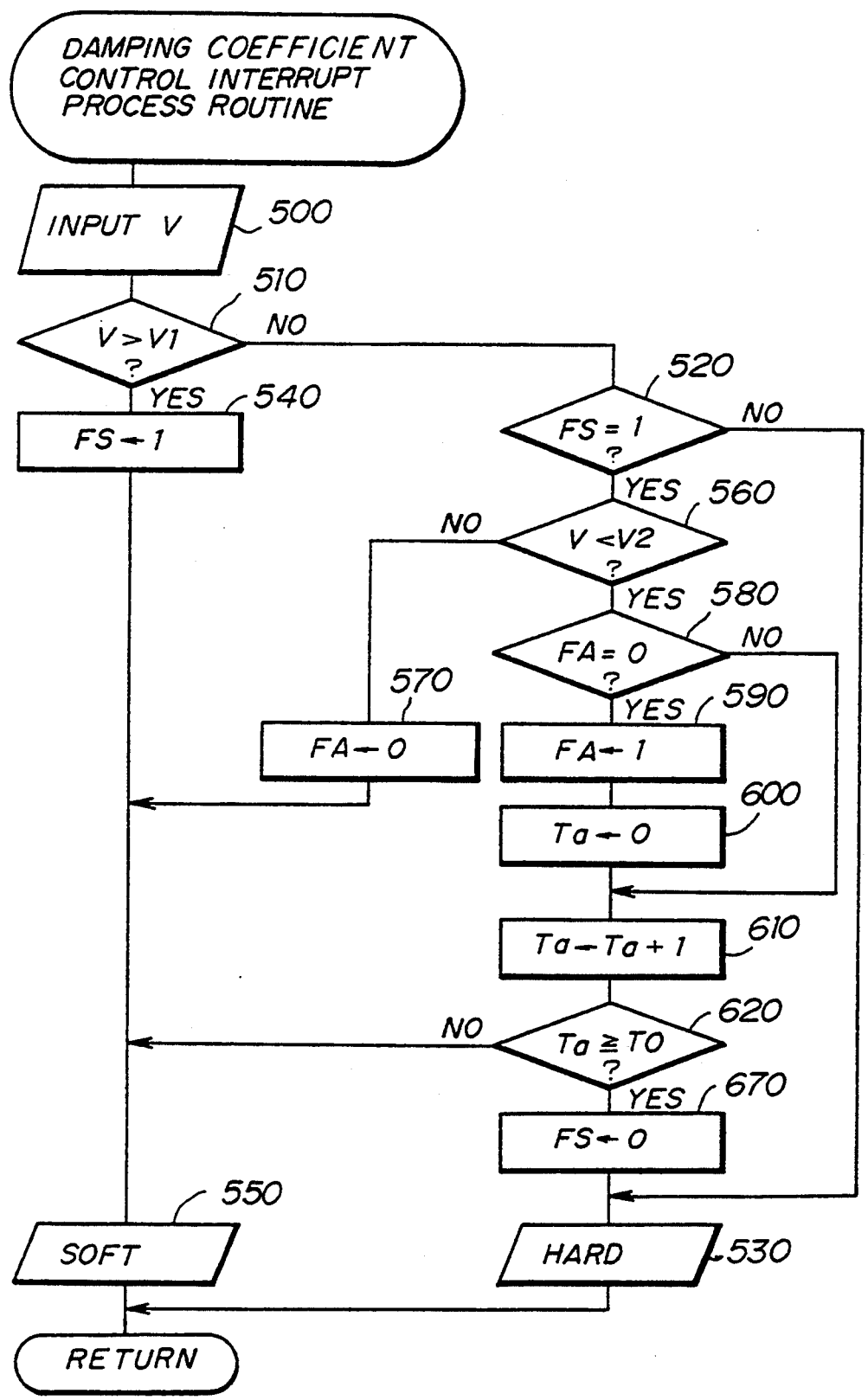
FIG. 11 is a flowchart illustrating the operation of the suspension control system according to the second preferred embodiment of the present invention.

Referring to FIG. 11, there is illustrated a procedure for controlling the setting of the shock absorber 2 being considered. The procedure shown in FIG. 11 commences with step 500, at which step the CPU 61 inputs the damping force change rate V regarding each shock absorber 2 from the damping force change rate detection circuit 70 via the input interface circuit 67. At step 510, the CPU 61 determines whether or not the damping force change rate V is greater than a first reference value V1 (which corresponds to the aforementioned first reference value S1). The first reference value V1 may be a fixed value or varies in accordance with the vehicle speed Sp. Also, the first reference vale V1 is obtained by the learning procedure in the same way as the aforementioned first embodiment of the present invention.

Figure 12:
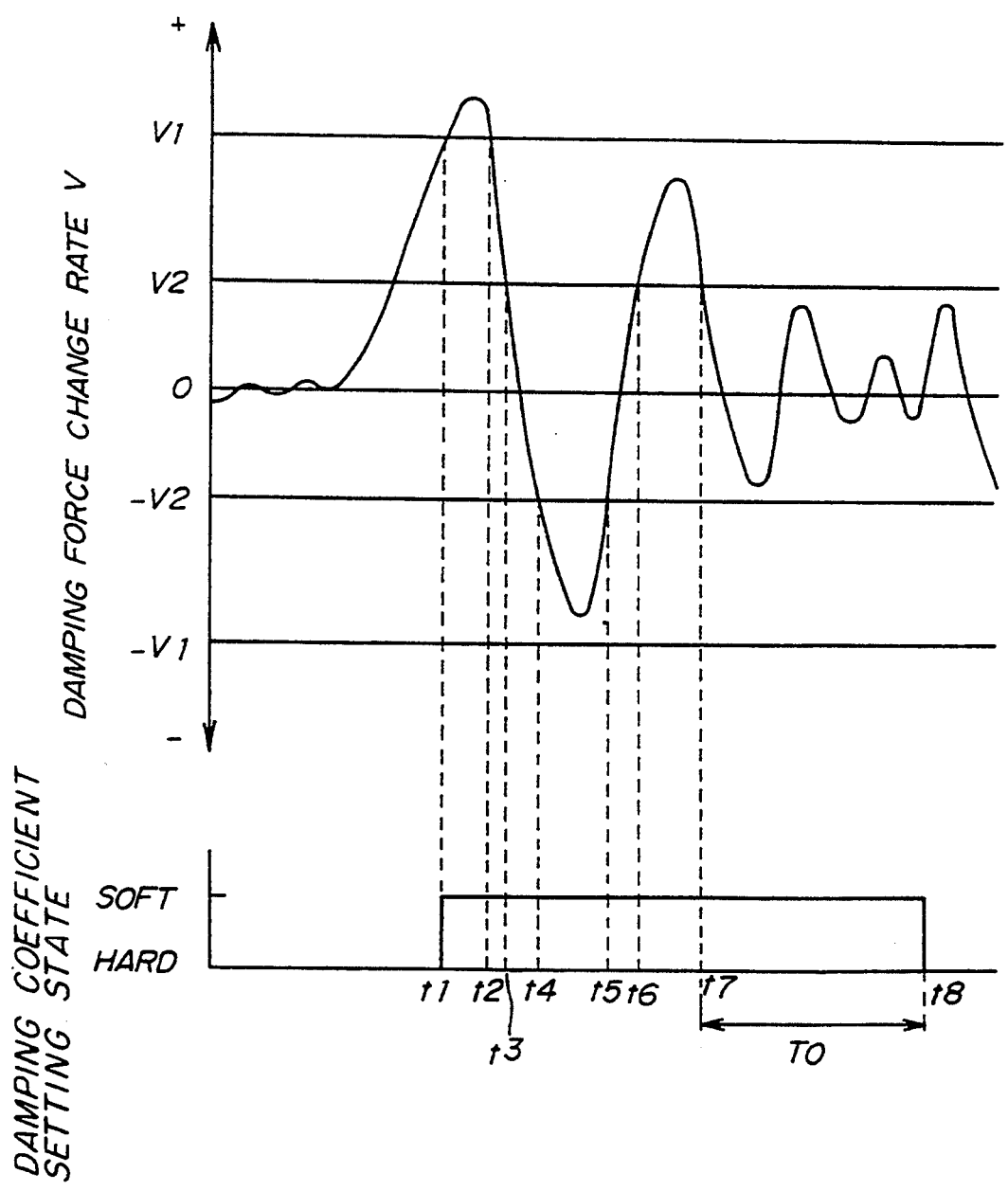
FIG. 12 is a graph illustrating the operation of the suspension control system according to the second preferred embodiment of the present invention.

FIG. 12 is a waveform diagram illustrating an example of the damping force change rate V. When the damping force change rate V is less than the first reference value V1, for example, before time $t_1$, the CPU 61 determines whether or not the shock absorber 2 is in the soft state at step 520 by checking a flag FS (which corresponds to the aforementioned flag FHS). When it is determined, at step 520, that the flag FS is not equal to 1, the CPU 61 controls the shock absorber 2 so that the damping coefficient of the shock absorber 2 is set to the hard state at step 530, and ends the procedure shown in FIG. 11.

On the other hand, when it is determined, at step 510, that the damping force change rate V becomes greater than the first reference value V1, for example, at time $t_1$ shown in FIG. 12, the CPU 61 sets the flag FS corresponding to the aforementioned FHS to 1 at step 540. At step 550, the CPU 61 set the shock absorber 2 to the soft state in the same way as step 130 shown in FIG. 5.

At time $t_2$ shown in FIG. 12, the damping force change rate V becomes equal to less than the first reference value V1. At this time, the result obtained at step 510 becomes NO. The CPU 61 checks the flag FS at step 520, and determines, at step 560, whether or not the damping force change rate V is less than a second reference value V2, which is less than the first reference value V1. It will be noted that the second reference value V2 corresponds to the aforementioned second reference value S2. During the period between time $t_2$ and $t_3$ shown in FIG. 12, the result obtained at step 560 is NO. The CPU 61 resets a flag FA to zero at step 570. The flag FA indicates the fact that the damping force change rate V becomes less than the second reference value V2 when it is equal to 1. Then, the CPU 61 carries out step 550.

When time $t_3$ has elapsed by repeatedly carrying out the above-mentioned process, the result obtained at step 560 becomes YES. At step 580, the CPU 61 discerns whether or not the flag FA is equal to 0. The flag FA is set to 1 after the damping force change rate V becomes less than the second reference value V2. Thus, the flag FA is equal to 0 immediately after the damping force change rate V becomes less than the second reference value V2. Thus, when FA=0, the CPU 61 sets the flag FA to 1 at step 590, and starts a timer Ta at step 600.

After executing step 600, or when the result obtained at step 580 is NO, the value of the timer variable Ta is incremented by 1 at step 610. At step 620 subsequent to step 610, the CPU 61 judges whether or not the value of the timer variable Ta is equal to a predetermined reference period T0. When the result at step 620 is NO, the CPU 61 executes step 550 at which step the setting of the damping coefficient is maintained in the soft state. Each time the routine shown in FIG. 11 is carried out, the timer variable Ta is incremented by 1. Thus, the result at step 620 is NO until the value of the timer variable Ta becomes equal to the reference period T0.

When the result at step 620 is YES, the CPU 61 resets the flag FS to zero at step 670, and sets the damping coefficient to the hard state. Then, the procedure shown in FIG. 11 is ended.

After time $t_3$ shown in FIG. 12, the result obtained at step 560 becomes YES, and the value of the timer variable Ta is compared with the reference period T0 at step 620. Since the period between time $t_3$ and $t_4$ is shorter than the reference period T0, the setting of the damping coefficient is continuously maintained in the soft state. After time $t_4$, the result obtained at step 560 becomes NO, and the setting of the damping coefficient is continuously maintained in the soft state. The period between time $t_5$ and time $t_7$ shown in FIG. 12, the setting of the damping coefficient is continuously maintained in the soft state. After time $t_7$, the period during which the damping force change rate V is continuously less than the second reference value V2 exceeds the reference period T0. Thus, the result obtained at step 620 becomes YES, and the setting of the damping coefficient is altered to the hard state at time $t_8$ at which the reference time to has elapsed from time $t_7$. After that, the setting of the damping coefficient is maintained in the hard state until the damping force change rate V exceeds the first reference value V1.

By repeatedly carrying out the procedure shown in FIG. 11, the damping coefficient of each shock absorber 2 is set to the low level immediately after the damping force change rate V exceeds the first reference value V1 (at time $t_1$ shown in FIG. 12), and maintained at the low level until the reference period T0 elapses (time $t_8$) after the damping force change rate V becomes equal to or less than the first reference value V1 in the state where the damping force change rate V is less than the second reference value V2. After that, the damping coefficient is set to the high level.

According to the above-mentioned second embodiment of the present invention, it becomes possible to very reliably control the setting of the damping coefficient of each shock absorber 2 in accordance with the road surface condition as in the case of the aforementioned first embodiment of the present invention. More specifically, the second embodiment of the present invention has the following advantages.

When the vehicle is traveling on a substantially flat road surface, the damping force change rate V becomes less than the second reference value V2 soon after the damping force change rate V exceeds the first reference value V1. Thus, the damping coefficient of the shock absorber 2 is maintained at the low level for a short period. Thus, even if the vehicle is riding over a small step portion on a substantially flat road surface, the setting of the damping coefficient is returned to the hard state soon after it is altered to the soft state. As a result, good driving comfort is obtained, and it is thus possible to prevent the setting of the damping coefficient from being in the soft state for a longer time than necessary and to prevent the road holding properties from deteriorating.

On the other hand, when the vehicle is traveling on a rough road surface, the damping force change rate V changes greatly, and frequently exceeds not only the first reference V1 but also the second reference V2. Thus, the period during which the damping force change rate V is continuously less than the second reference value V2 becomes short after the damping coefficient of the shock absorber 2 is set to the soft state. Thus, the period during which the setting of the damping coefficient becomes possible to prevent the setting of the damping coefficient from being unnecessarily altered. Hence, it is possible to obtain improved drive feeling and improved durability of shock absorbers.

Figure 13:
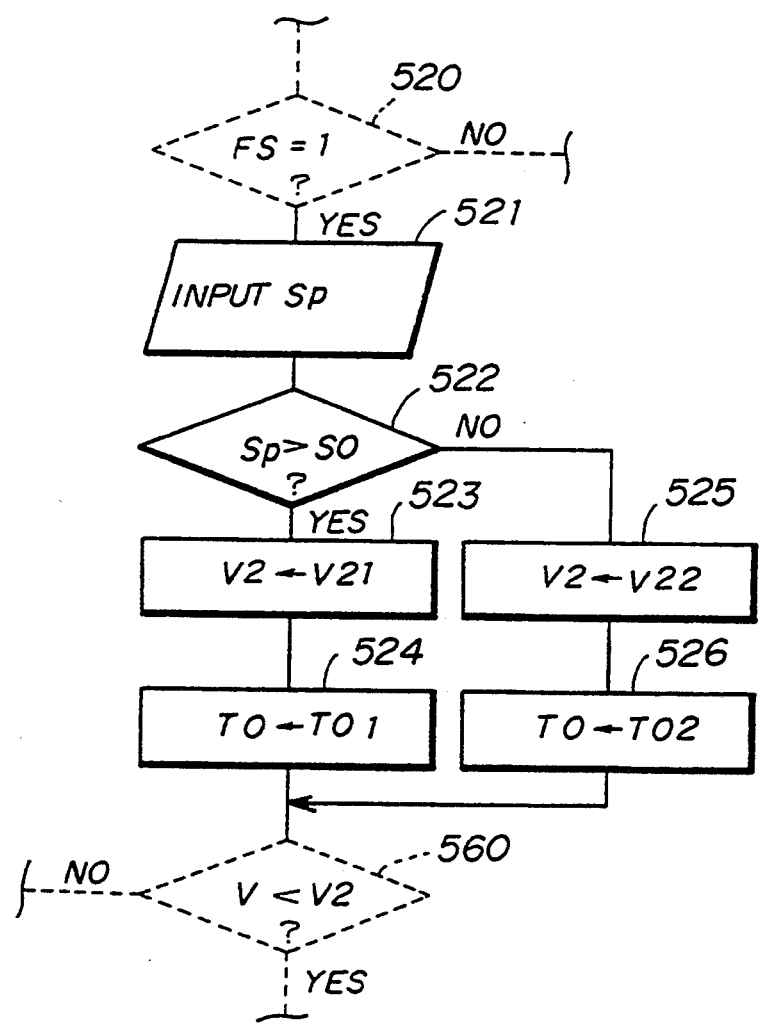
FIG. 13 is a flowchart illustrating the operation of a variation of the suspension control system according to the second preferred embodiment of the present invention.

A description will be given of a variation of the second embodiment of the present invention with reference to FIG. 13. In the variation, the second reference value V2 and the reference period T0 are respectively varied in accordance with the vehicle speed Sp. The variation includes a procedure composed of steps 521–526, which are arranged between step 520 and 560 shown in FIG. 11.

At step 521, the vehicle speed Sp measured by the speed sensor 51 is input to the CPU 61 via the waveform shaping circuit 73. At step 522, the CPU 61 determines whether or not the vehicle speed Sp is greater than a predetermined reference vehicle speed S0. When Sp>S0, the the CPU 61 writes a value V21 into the second reference value V2 at step 523, and writes a value T01 written into the reference period T0. When S≦0, the CPU 61 writes a value V22 smaller than V21 into the second reference value V2 at step 525, and writes a value T02 greater than T01 into the reference period T0. That is, when the vehicle is traveling at a high speed greater than the reference vehicle speed S0, the second reference value V2 is increased, and the reference period T0 is shortened, as compared with the corresponding values when the vehicle is traveling at a low speed less than the reference vehicle speed S0. It can be seen from the above description when the vehicle is traveling at a high speed greater than S0, the setting of the damping coefficient is controlled so that the damping coefficient is easily altered to the hard state from the soft state, as compared with the case where the vehicle is traveling at a low speed equal to or less than S0. It will be noted that when the vehicle is traveling at a high speed, the damping force change rate V itself increases. According to the above-mentioned procedure of the variation, it becomes possible to prevent the damping coefficient of the shock absorber 2 from being unnecessarily set to the soft state and obtain a hard-oriented suspension characteristic which is required when the vehicle is traveling at a high speed.

It is possible to provide variations and modifications from the second embodiment of the present invention. For example, it is possible to provide the second reference value V2 which consists of a positive-side value and a negative-side value different from the positive value. It is also possible to determine the reference period T0 on the basis of the peak value of the damping force change rate V.

Figure 14:
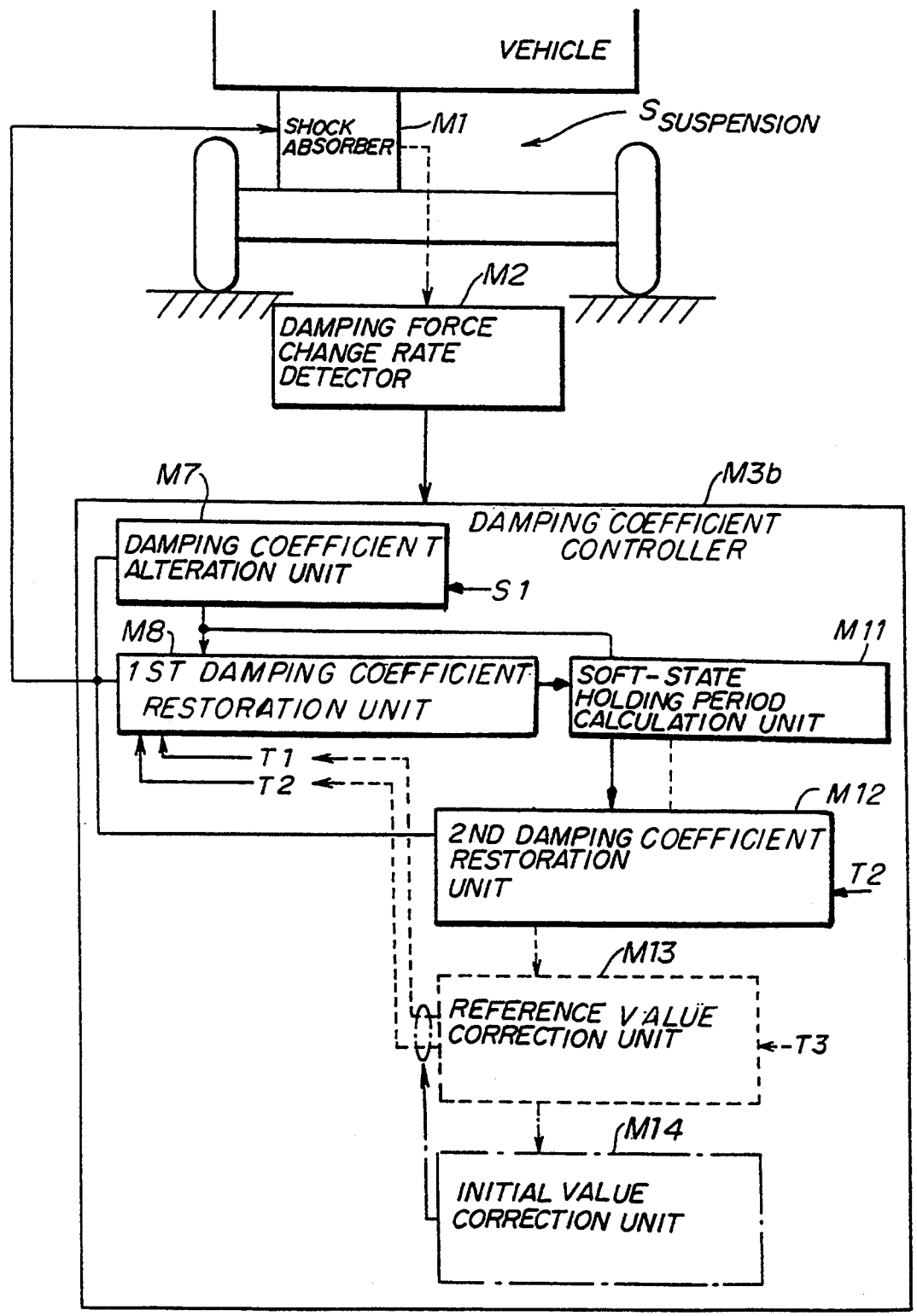
FIG. 14 is a block diagram illustrating a suspension control system according to a third preferred embodiment of the present invention.

A description will now be given of a third preferred embodiment of the present invention with reference to FIG. 14, in which those parts which are the same as those shown in the previous figures are given the same reference numerals. Referring to FIG. 14, a suspension control system is composed of the damping coefficient change rate detector M2 and a damping coefficient controller M3b. The damping coefficient controller M3b is composed of a soft-state holding period calculation unit M11 and a second second damping coefficient alteration unit M12 in addition to the damping coefficient alteration unit M7 and the damping coefficient restoration unit M8 shown in FIG. 10. In the following description of the third embodiment of the present invention, the damping coefficient restoration unit M8 is referred to as a first damping coefficient restoration unit M8.

As has been described previously, the damping coefficient alteration unit M7 determines whether or not the damping coefficient change rate V output by the damping force change rate detector M2 is outside of the range defined by the aforementioned first reference value S1. When the damping force change rate V is outside of the range defined by the first reference value S1, the damping coefficient alteration unit M7 controls the shock absorber M1 so that the setting of the damping coefficient is altered to the soft state from the hard state. The first damping coefficient restoration unit M8 determines whether or not the damping force change rate V is continuously within the range defined by the second reference value S2 (less than the first reference value S1) for at least the aforementioned predetermined period (hereafter referred to as a first predetermined period T1) from the time when the setting of the damping coefficient is altered to the soft state. When the result of this determination is affirmative, the first damping coefficient restoration unit M8 controls the shock absorber M1 so that the setting of the damping coefficient is restored to the hard state.

The soft-state holding period calculation unit M11 calculates a soft-state holding period between the time when the setting of the damping coefficient is altered to the soft state by the damping force alteration unit M7 and the time when the setting of the damping coefficient is restored to the hard state by the first damping coefficient restoration unit M8. The second damping coefficient restoration unit M12 determines whether or not the soft-state holing period calculated by the soft-state holding period calculation unit M 11 is longer than a second predetermined period T2. When the result of this determination is affirmative, the second damping coefficient restoration unit M12 controls the shock absorber M1 so that the setting of the damping coefficient is restored to the hard state from the soft state. The second damping coefficient restoration unit M12 is provided for preventing the setting of the damping coefficient from being maintained in the soft state for a period longer than necessary.

This purpose is also achieved by replacing the second damping coefficient restoration unit M12 by a reference value correction unit M12 or using the reference value correction unit M12 together with the second damping coefficient restoration unit M12. When the soft-state holding period calculated by the soft-state holding period calculation unit M11 is longer than a third predetermined period T3, the reference value correction unit M13 corrects the second reference value S2 in such a way that the second reference value S2 is increased so that a new range defined by an increased reference value S2 becomes wider than before, and controls the first predetermined period T1 so that it is shortened. That is, the condition for restoring the setting of the damping coefficient to the hard state is relaxed so that it facilitates the restoration of the damping coefficient. Alternatively, it is possible to correct either the second reference value S2 or the first predetermined period T1.

It is also possible to employ an initial value correction unit M14 in addition to the reference value correction unit M13. The initial value correction unit M14 increases an initial value of the second reference value S2 and decreases an initial value of the first predetermined period T1 when the reference value correction unit M13 corrects the first predetermined period T1 and the second reference value S2 to a large extent, as compared with a predetermined condition. That is, the condition for restoring the setting of the damping coefficient from the soft state to the hard state is corrected so that it facilitates the restoration of the damping coefficient. It is possible to design the initial value correction unit M14 so that it corrects either the first predetermined period T1 or the second reference value S2.

Figure 15B:
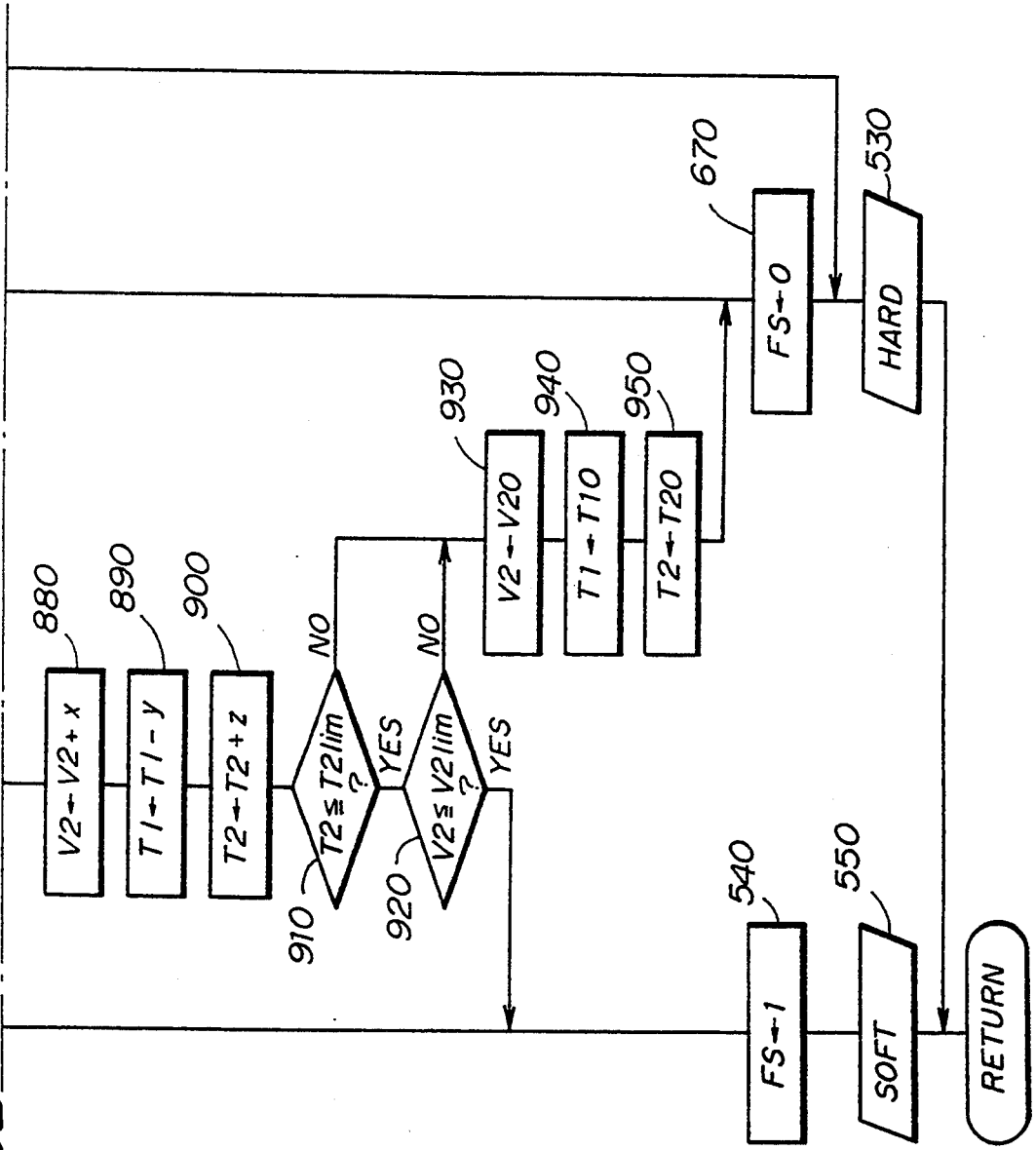

A further description will now be given of the third embodiment of the present invention with reference to FIGS. 15A and 15B, in which those steps which are the same as those shown in FIG. 11 are given the same reference numerals. The third embodiment has shock absorbers, each having the configuration shown in FIGS. 3A and 3B, and the system shown in FIG. 4. The CPU 61 used in the third embodiment of the present invention executes a damping coefficient control interrupt routine (procedure) shown in FIGS. 15A and 15B. After turning the power supply ON, various flags including the aforementioned flags FS and FA are reset to zero, and the procedure shown in FIGS. 15A and 15B is repeatedly carried out. The CPU 61 inputs the damping force change rate V regarding the shock absorber 2 being considered at step 500, and determines whether or not V>V1 at step 510. As has been described previously, the first reference V1 is provided for altering the setting of the shock absorber 2 from the hard state to the soft state.

Figure 16:
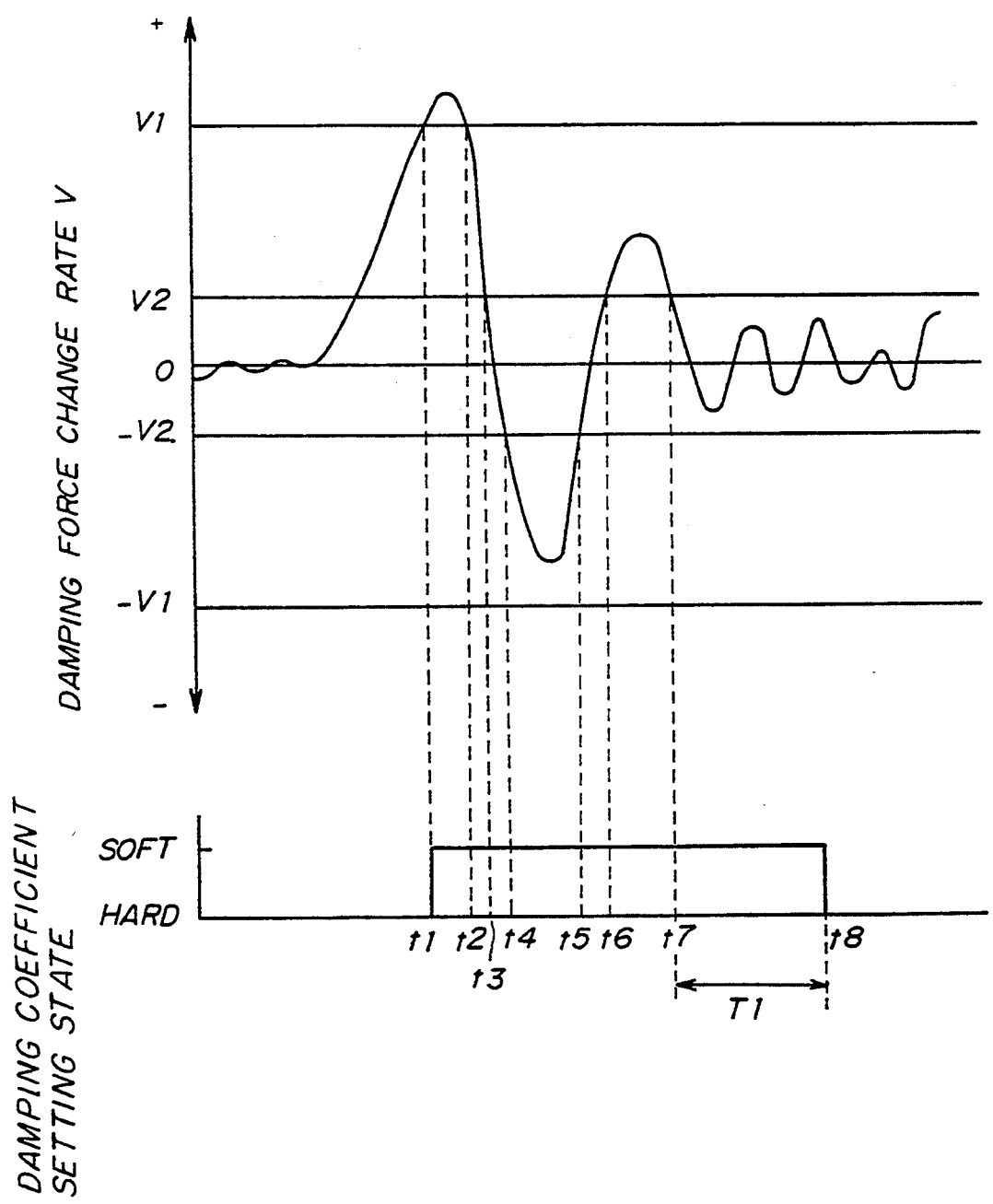
FIGS. 16 and 17 are diagrams illustrating the operation of the suspension control system according to the third preferred embodiment of the present invention.

FIG. 16 is a waveform diagram illustrating an example of a change of the damping force change rate V. When the damping force change rate V is less than the first reference value V1, for example, before time $t_1$, the CPU 61 determines whether or not the shock absorber 2 is in the soft state at step 520 by checking the flag FS (which corresponds to the aforementioned flag FHS). When it is determined, at step 520, that the flag FS is not equal to 1, the CPU 61 controls the shock absorber 2 so that the damping coefficient of the shock absorber 2 is set to the hard state at step 530, and ends the procedure shown in FIG. 11.

On the other hand, when it is determined, at step 510, that the damping force change rate V becomes greater than the first reference value V1, for example, at time $t_1$ shown in FIG. 16, the CPU 61 determines, at step 740, whether or not the flag FS is equal to 1. When FS=0, that is, when the setting of the damping coefficient at this time is hard, the CPU 61 resets a timer Ts to zero at step 740. The timer Ts is provided for measuring the soft-state holding period. On the other hand, the current setting of the damping coefficient is soft, the CPU 61 increments the timer Ts by 1 at step 760, which is also executed after step 750. At step 770, the CPU 61 determines whether or not the value of the timer Ts is equal to or less than the second (soft state) reference period T2. When the result at step 770 is YES, the setting of the damping coefficient is maintained in the soft state at step 550 after the flag FS is set to 1 at step 540. The case where it is determined that Ts>T2 will be described later. Until that time, the following description assumes that Ts≦T2.

When it is determined, at step 510, that the damping force change rate V becomes equal to or less than the first reference value V1 (at time $t_1$ shown in FIG. 16) and the flag FS is equal to 1 at step 520, the CPU 61 executes step 560, at which step it is determined whether or not the damping force change rate V is less than the second reference value V2 (less than the first reference value V1). During the period between time $t_2$ and $t_3$ shown in FIG. 16, the result at step 560 is successively NO. At step 570, the CPU 61 resets the flag FA to zero, and executes step 740. During the above-mentioned operation, the shock absorber 2 is maintained in the soft state.

The above-mentioned procedure is repeatedly carried out. Then, the result obtained at step 560 becomes YES (at time $t_3$). At step 580, the CPU 61 discerns whether or not the flag FA is equal to 0. The flag FA is set to 1 after the damping force change rate V becomes less than the second reference value V2. Thus, the flag FA is equal to 0 immediately after the damping force change rate V has become less than the second reference value V2. Thus, when FA=0, the CPU 61 sets the flag FA to 1 at step 590, and starts the aforementioned timer Ta at step 600.

After executing step 600, or when the result obtained at step 580 is NO, the value of the timer variable Ta is incremented by 1 at step 610. At step 860 subsequent to step 610, the CPU 61 judges whether or not the value of the timer variable Ta is equal to a predetermined reference period T1. When the result at step 860 is NO, the CPU 61 executes step 740, so that the setting of the damping coefficient is maintained in the soft state. Each time the routine shown in FIGS. 15A and 15B is carried out, the timer variable Ta is incremented by 1. At step 860, the CPU 61 determines whether or not the value of the timer variable is equal to or greater than the first predetermined period T1. When the result at step 860 is NO, the CPU 61 executes step 740, so that the setting of the damping coefficient is continuously maintained in the soft state. The first predetermined period T1 provides the setting restoration condition used when the situation, V<V2, is continuously satisfied.

When it is determined, at step 860, that Ta≧T1, the CPU 61 resets the flag FS to zero at step 670, and alters the setting of the shock absorber 2 to the hard state from the soft state at step 530. Then the procedure ends. That is, when the period during which the damping force change rate V is continuously less than the second reference value V2 becomes longer than the first reference period T1, the setting of the damping coefficient is altered to the hard state.

After time $t_3$ shown in FIG. 16, the result obtained at step 560 becomes YES, and the value of the timer variable Ta is compared with the reference period T1 at step 860. Since the period between time $t_3$ and $t_4$ is shorter than the reference period T1, the setting of the damping coefficient force is maintained in the soft state. After time $t_4$, the result obtained at step 560 becomes NO, and the setting of the damping coefficient is continuously maintained in the soft state. The period between time $t_5$ and time $t_7$ shown in FIG. 16, the setting of the damping coefficient is continuously maintained in the soft state. After time $t_7$, the period during which the damping force change rate V is continuously less than the second reference value V2 is longer than the reference period T1. Thus, the result obtained at step 860 becomes YES (Ta≧T1), and the setting of the damping coefficient is altered to the hard state at time $t_8$ at which the first reference period T1 has elapsed from time $t_7$.

A description will now be described of a case where the damping force change rate V is continuously less than the second reference value V2 during only a period which is shorter than the first reference period T1. In this case, the result obtained at step 560 or step 860 is NO, and thus the setting of the damping coefficient is maintained in the soft state. When the value of the timer variable Ts, which indicates the period during which the setting of the shock absorber 2 is maintained in the soft state, becomes longer than the second (soft state) reference period T2, the result obtained at step 770 becomes NO, and the CPU 61 executes step 880 (FIG. 15B).

The CPU 61 increments the value of the second reference value V2 by a value x at step 880, and decreases the first reference period T1 by y at step 890. That is, the procedure of steps 880 and 890 functions to change the conditions respectively defined at steps 560 and 860 so that the affirmative results are obtained more easily than before. At step 900, the CPU 61 increases the second reference period T2 by z (z>T1). Thereby, the condition defined at step 770 is changed, so that the CPU 61 determines a time at which the procedure starting from the step 880 is to be started.

At step 910, the CPU 61 determines whether or not the increased soft-state reference period T2 is equal to or less than a predetermined upper limit value T2lim. When the result at step 910 is YES, the CPU 61 determines, at step 920, whether or not the second reference value V2 is equal to or less than a predetermined upper limit value V2lim. When the result at step 920 is YES, the CPU 61 executes step 540, so that the setting of the damping coefficient is continuously maintained in the soft state. That is, the number of times that the increasing procedures at steps 880 and 900 have not been carried out many times is not so many, the second reference period T2 and the second reference value V2 are still less than the soft-state upper limit value T2lim and the upper limit value V2lim, respectively.

Figure 17:
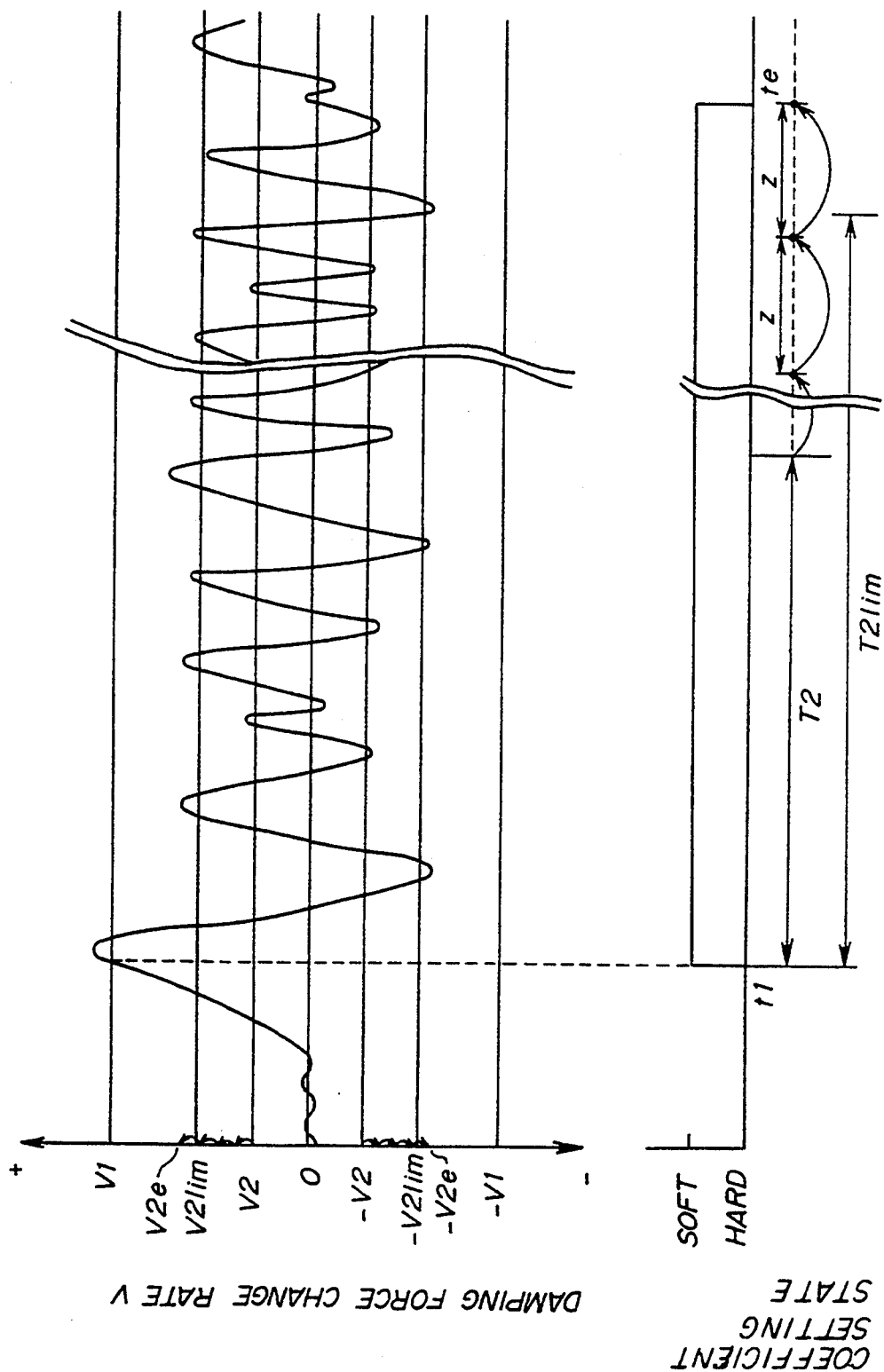

When the result obtained at step 910 or step 920 becomes NO even by repeatedly carrying out the steps 880, 890 and 900 (or at time $t_e$ or when the second reference value V2 increases to V2e shown in FIG. 17), the CPU 61 successively executes step 930, 940 and 950. At step 930, an initial value V20 is written into the second reference value T1. At step 940, an initial value T10 is written into the first reference period T1. At step 950, an initial value T20 is written into the second (soft state) reference period T2. Then, the CPU 61 executes step 670 and the damping coefficient is altered to the hard state.

By executing the procedure shown in FIGS. 15A and 15B, the damping coefficient of each shock absorber 2 is set to the soft state immediately after the corresponding damping force change rate V exceeds the first reference value V1 (at time $t_1$ shown in FIG. 17), and continuously maintained in the soft state until the damping force change rate V is continuously less than the second reference value until at least the first reference period T1 elapses (time $t_8$ shown in FIG. 17) from the time when the damping force change rate becomes less than the first reference value V1. After that, the setting of the damping coefficient is altered to the hard state.

When the damping force change rate V is continuously less than the second reference value V2 during only a period less than the first reference period T1, the judgment condition for altering the setting of the damping coefficient from the soft state to the hard state is changed so that the setting of the damping coefficient is restored to the hard state more easily than before. Even if the setting of the damping coefficient has not yet been restored to the hard state, the setting of the damping coefficient is once restored to the hard state when the second reference period T2 or the second reference value V2 becomes equal to the soft upper limit value T2lim or the second upper limit value V2lim, respectively. With the above-mentioned control, it is possible to very reliably control the setting of each shock absorber in accordance with the road surface condition.

When the vehicle is traveling on a flat road surface, if the damping force change rate V exceeds the first reference value V1, the damping force change rate V becomes less than the second reference value V2 soon. Thus, the setting of the damping coefficient of the shock absorber 2 is maintained in the soft state during a short period, and then restored to the hard state. Thus, if the vehicle is riding over a small stepped portion on a substantially flat road surface, the setting of the damping coefficient is restored to the hard state soon, so that improved riding comfort can be obtained. Thus, it becomes possible to prevent the setting of the damping coefficient from being in the soft state during an unnecessary period and prevent the road holding ability from deteriorating.

On the other hand, when the vehicle is continuously traveling on a rough road surface, the damping force change rate V changes greatly, and will frequently exceed the second reference value V2 after it exceeds the first reference value V1. Thus, the damping force change rate V is continuously less than the second reference value V2 during only short period after the shock absorber 2 is set to the soft state. Thus, the soft-state holding period T2 is elongated, so that it is possible to prevent the alteration frequency from increasing. Since the upper limit T2lim is provided for the soft-state holding period T2. Thus, it is possible to prevent the setting of the damping coefficient from being maintained in the soft state during a long period. As a result, improved driving feeling and improved durability of the shock absorber 2 can be obtained.

In the third embodiment of the present invention, the setting of the damping coefficient is restored to the hard state on the basis of the soft-state (second) upper limit value T2lim and the upper limit value V2lim respectively provided for the second predetermined period t2 and the second reference value V2. Alternatively, it is possible to employ either the soft-state upper limit value T2lim or the upper limit value V2lim.

Figure 18:
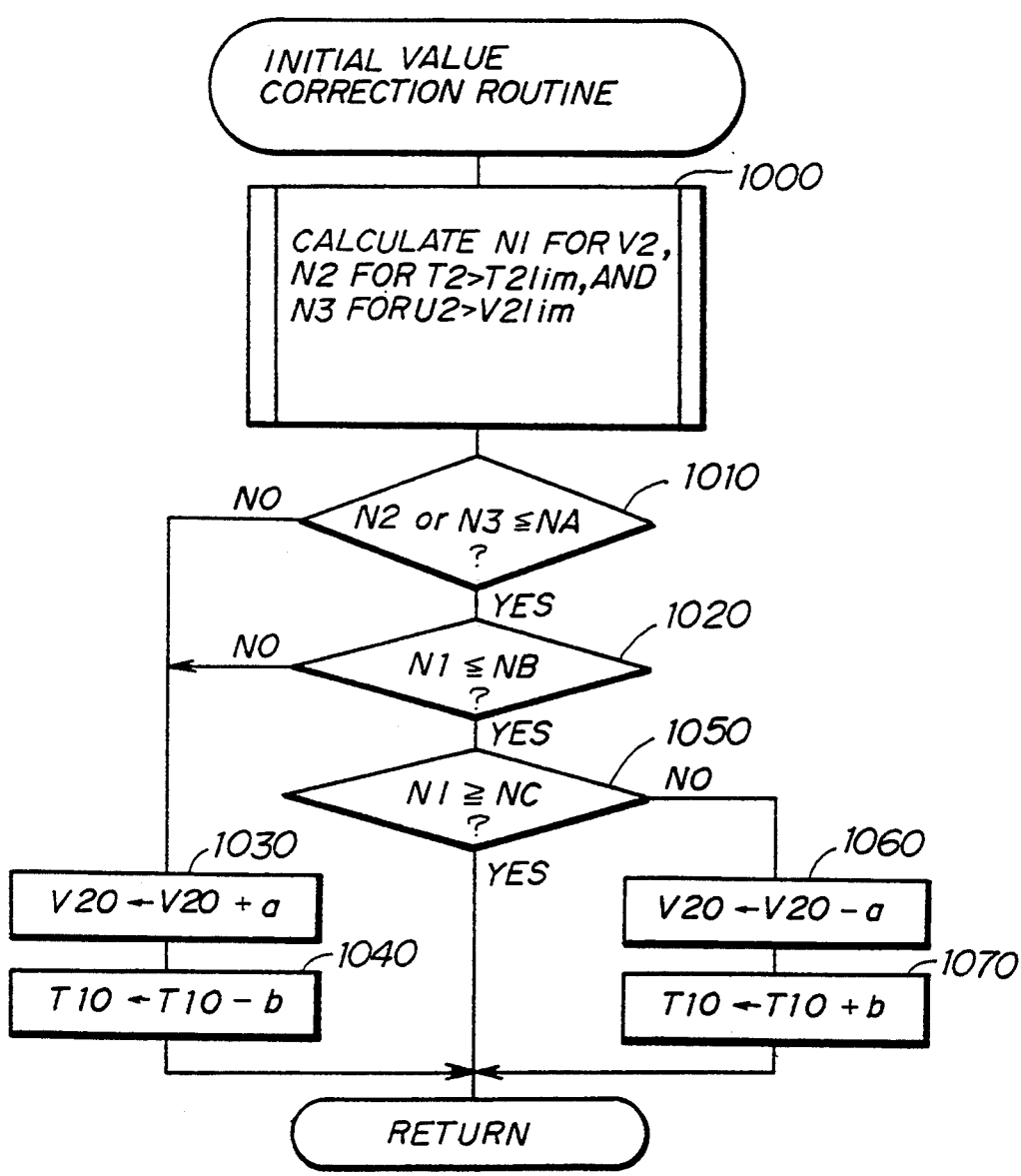
FIG. 18 is a flowchart illustrating the operation of a variation of the suspension control system according to the third preferred embodiment of the present invention.

A description will now be given of a procedure (initial value correction routine) for determining the initial values V20 and T10 used in the procedure shown in FIGS. 15A and 15B, with reference to FIG. 18. The procedure shown in FIG. 18 is repeatedly carried out at predetermined intervals which are slightly longer than those for the procedure shown in FIGS. 15A and 15B. At step 1000, the CPU 61 calculates frequencies N1, N2 and N3 during the predetermined period during which the procedure shown in FIGS. 15A and 15B is repeatedly carried out. N1 denotes a correction frequency which corresponds to the number of times that the second reference value V2 used for defining th range between −V2 and +V2 is corrected during the predetermined period. N2 denotes an upper limit reaching frequency which corresponds to the number of times that the second (soft state) reference period T2 exceeds the soft-state upper limit value T2lim for the predetermined period. N3 denotes an upper limit reaching frequency which corresponds to the number of times that the second reference value V2 exceeds the upper limit value V2lim during the predetermined period.

At step 1010 subsequent to step 1000, the CPU 61 determines whether or not the upper limit reaching frequency N2 or N3 is equal to or less than a predetermined upper limit reference frequency NA. When the result obtained at step 1010 is YES, the CPU 61 determines, at step 1020, whether or not the correction frequency N1 is equal to or less than a correction reference frequency NB. When the result obtained at step 1010 or step 1020 is NO, the CPU 61 executes step 1030, at which step the initial value V20 of the second reference value V2 is increased by 'a'. Subsequently, the CPU 61 executes step 1040, at which step the initial value T10 of the first reference period T1 is decreased by 'b'. Then, the procedure shown in FIG. 18 ends.

On the other hand, when the result at step 1020 is YES, the CPU 61 determines, at step 1050, whether or not the correction frequency N1 is equal to or greater than a minimum correction frequency NC (NB>NC). When the result obtained at step 1050 is YES, the procedure ends. On the other hand, when the result at step 1050 is NO, the initial value V20 of the second reference value V2 is decreased by 'a' at step 1060, and the initial value T10 of the first reference period T1 is increased by 'b'. The initial values T10 and V10 are arbitrarily selected, for example, on the basis of experimental results. Similarly, values 'a' and 'b' are selected.

When the vehicle is traveling on a rough road surface, the correction frequency N1 is high. In such a case, the number of times that the correction (steps 880–900) is carried out is reduced and thus the soft-state holding period is reduced. Thus, it becomes possible to very reliably control the setting of the damping force in accordance with the road surface condition which is varying momentarily.

On the other hand, when the correction frequency N1 is less than the minimum correction frequency NC1, the initial value V20 is corrected to decrease, and the initial value T10 is corrected to increase. Thus, when the vehicle starts to travel on a rough road surface, there is an increase in the number of times that the correction (steps 880–900) is carried out until the setting of the damping coefficient is restored to the hard state from the soft state by the procedure shown in FIGS. 15A and 15B. Thus, the soft-state holding period is elongated. Thus, it becomes possible to very reliably control the setting of the damping coefficient in accordance with the road surface condition and thus improve riding comfort, driving controllability and stability.

It is possible to further modify the above-mentioned third embodiment of the present invention. In the above-mentioned third embodiment of the present invention, the first reference value V1 consists of positive and negative values equal to each other. Alternatively, it is possible to replace the first reference value V1 by a positive reference value and a negative reference value which is different from the positive reference value. It is also possible to correct either the second reference value V2 or the first reference period T1. It is also possible to correct either the initial value V20 or the initial value T10.

In the specifically disclosed embodiments of the present invention, there are provided shock absorbers, each providing the hard state and the soft state. Alternatively, it is possible to employ different types of shock absorbers having, for example, three or more states, such as hard, sport and soft states. It is also possible to employ shock absorbers which continuously varies the level (setting) of the damping coefficient.

The present invention are not limited to the specifically disclosed embodiments, and variations and modifications may be made without departing from the scope of the present invention.

What is claimed is:

1. A suspension control system for controlling a suspension having a shock absorber provided for a wheel of a vehicle, said suspension control system comprising:

damping force change rate detecting means for detecting a damping coefficient change rate indicating a rate of change of a damping force of said shock absorber;

damping coefficient controlling means, coupled to said shock absorber and said damping force change rate detecting means, for setting a damping coefficient of said shock absorber to a first level from a second level less than the first level when the damping force change rate has exceeded an adjustment reference value;

damping coefficient alteration holding means, coupled to said shock absorber and said damping coefficient controlling means, for continuously maintaining the setting of the damping coefficient at the first level for a holding period after said damping coefficient controlling means alters the setting of the damping coefficient from the second level to said first level, said holding period being a first period starting from a time when said adjustment reference value becomes greater than said damping force change rate after said damping coefficient controlling means alters the setting of the damping coefficient from the second level to the first level;

road surface condition judgement means for judging whether or not a road surface on which said vehicle has traveled for said holding period is rough; and holding period correction means, coupled to said damping coefficient alteration holding means and said road surface condition judgement means, for elongating said holding period so that said holding period is a second period which is longer than said first period and which starts from said time when said adjustment reference value becomes greater than said damping force change rate after said damping coefficient controlling means alters the setting of the damping coefficient from the second level to the first level.

2. A suspension control system as claimed in claim 1, wherein said road surface condition judgment means comprises:

frequency calculation means for calculating a frequency which indicates the number of times that said damping force change rate exceeds a learning reference value less than said adjustment reference value for a fixed period; and judging means for judging whether or not said road surface is rough on the basis of said frequency calculated by said frequency calculation means.

3. A suspension control system as claimed in claim 2, wherein said road surface condition judgment means comprises:

averaging means for averaging a plurality of frequencies, each being obtained by said frequency calculation means for each said fixed period and for outputting a frequency average; and comparing means for comparing said frequency average with a predetermined threshold frequency and for outputting a comparison result which indicates whether or not said road surface is rough.

4. A suspension control system as claimed in claim 1, further comprising speed detection means for detecting a vehicle speed of said vehicle, wherein said adjustment reference value comprises a component which increases as the vehicle speed increases.

5. A suspension control system as claimed in claim 1, further comprising:

determining means for determining whether or not said road surface condition judgment means judges that said road surface is rough during a period between an end of said first period and an end of said second period; and means for stopping said damping coefficient alteration holding means from holding the setting of the damping coefficient at the first level when said determining means determines that said road surface condition judgment means judges that said road surface is not rough, so that the setting of the damping coefficient is restored to said second level from said first level.

6. A suspension control system for controlling a suspension having a shock absorber provided for a wheel of a vehicle, said suspension control system comprising:

damping coefficient change rate detecting means for detecting a damping force change rate indicating a rate of change of a damping force of said shock absorber;

damping coefficient alteration means, coupled to said shock absorber and said damping coefficient change rate detecting means, for determining whether or not said damping force change rate is outside a first range and for setting said damping force to a first level from a second level greater than said first level when it is determined that said damping force change rate is outside said first range; and damping coefficient restoration means, coupled to said damping force change rate detecting means, said damping coefficient alteration means and said shock absorber, for determining whether or not said damping force change rate is continuously within a second range, which is narrower than said first range and within said first range during at least a predetermined period after said damping coefficient alteration means alters the setting of the damping coefficient from said second level to said first level and for restoring the setting of the damping coefficient from said first level to said second level when it is determined that said damping force change rate is continuously within said second range for said predetermined period.

7. A suspension control system as claimed in claim 6, wherein said damping coefficient restoration means comprises:

first means for detecting a time when said damping force change rate goes into said second range; and second means for timing said predetermined period which starts from a starting time corresponding to said time when said damping force change rate goes into said second range.

8. A suspension control system as claimed in claim 7, further comprising resetting means for resetting said second means to said starting time when said damping coefficient restoration means determines that said damping force change rate goes outside of said second range.

9. A suspension control system as claimed in claim 6, further comprising:

speed detection means for detecting a vehicle speed of said vehicle; and adjustment means, coupled to said speed detection means and said damping coefficient restoration means, for adjusting said second range on the basis of said vehicle speed.

10. A suspension control system as claimed in claim 9, wherein said adjustment means comprises:
   comparing means for comparing said vehicle speed with a predetermined vehicle speed and for outputting a comparison result; and
   means for increasing said second range when the comparison result output by said comparing means indicates that the vehicle speed is greater than said predetermined vehicle speed and for decreasing said second range when the comparison result output by said second comparing means indicates that the vehicle speed is equal to or less than said predetermined vehicle speed.

11. A suspension control system as claimed in claim 6, further comprising:
   speed detection means for detecting a vehicle speed of said vehicle; and
   adjustment means, coupled to said speed detection means and said damping coefficient restoration means, for adjusting said predetermined period on the basis of said vehicle speed.

12. A suspension control system as claimed in claim 11, wherein said adjustment means comprises:
   comparing means for comparing said vehicle speed with a predetermined vehicle speed and for outputting a comparison result; and
   means for decreasing said predetermined period when the comparison result output by said comparing means indicates that the vehicle speed is greater than said predetermined vehicle speed and for increasing said predetermined period when the comparison result output by said second comparing means indicates that the vehicle speed is equal to or less than said predetermined vehicle speed.

13. A suspension control system as claimed in claim 6, further comprising:
   speed detection means for detecting a vehicle speed of said vehicle;
   first adjustment means, coupled to said speed detection means and said damping coefficient restoration means, for adjusting said second range on the basis of the vehicle speed; and
   second adjustment means, coupled to said speed detection means and said damping coefficient restoration means, for adjusting said predetermined period on the basis of said vehicle speed.

14. A suspension control system for controlling a suspension having a shock absorber provided for a wheel of a vehicle, said suspension control system comprising:
   damping force change rate detecting means for detecting a damping force change rate indicating a rate of change of a damping force of said shock absorber;
   damping coefficient alteration means, coupled to said shock absorber and said damping force change rate detecting means, for determining whether or not said damping force change rate is outside a first range and for setting said damping coefficient to a first level from a second level greater than said first level when it is determined that said damping force change rate is outside said first range;
   first damping coefficient restoration means, coupled to said damping force change rate detecting means, said damping coefficient alteration means and said shock absorber, for determining whether or not said damping force change rate is continuously within a second range, which is narrower than said first range and within said first range during at least a first period after said damping coefficient alteration means alters the setting of the damping coefficient from said second level to said first level and for restoring the setting of the damping coefficient from said first level to said second level when it is determined that said damping force change rate is continuously within said second range for said predetermined period;
   holding period calculation means, coupled to said damping coefficient alteration means and said first damping coefficient restoration means, for calculating a holding period from a time when the setting of the damping coefficient is altered to the first level by said damping coefficient alteration means to a time when the setting of said damping coefficient is restored to said second level by said first damping coefficient restoration means; and
   second damping coefficient restoration means, coupled to said holding period calculation means and said shock absorber, for determining whether or not said holding period becomes longer than a second period and for restoring the setting of the damping coefficient from said first level to said second level when it is determined that said holding period has become longer than said second period.

15. A suspension control system as claimed in claim 14, further comprising correction means for determining whether or not said holding period becomes longer than a third period and for correcting said second range so that said first damping coefficient restoration means restores the setting of the damping coefficient to said second level from said first level more quickly than before said second range is corrected when it is determined that said holding period has become longer than said third period.

16. A suspension control system as claimed in claim 15, further comprising:
   determining means for determining whether or not said second range corrected by said correction means becomes wider than a limited range;
   means, coupled to said shock absorber and said determining means, for restoring the setting of said damping coefficient to said second level when said determining means determines that said second range has become longer than said limited range.

17. A suspension control system as claimed in claim 16, further comprising initialization means for setting said second range to an initial range when said determining means determines that said second range has become longer than said limited range.

18. A suspension control system as claimed in claim 17, further comprising:
   frequency calculation means for calculating a first frequency which indicates the number of times that said second range becomes wider than said limited range during a predetermined period;
   first comparing means for comparing said first frequency with a predetermined reference frequency and for outputting a comparison result; and
   first initial range correction means for correcting said initial range when said comparison result shows that said first frequency is less than said reference frequency, so that said first damping coefficient restoration means alters the setting of the damping coefficient from said first level to said second level more quickly than before said initial range is corrected.

19. A suspension control system as claimed in claim 18, further comprising:
   correction frequency calculation means for calculating a correction frequency which indicates the number of times that said correction means corrects said second range during said predetermined period;
   second comparing means for comparing said correction frequency with a first reference correction frequency and for outputting a comparison result when said comparison result output by said first comparing means shows said first frequency is equal to or greater than said predetermined reference frequency; and
   second initial range correction means for correcting said initial range when said comparison result output by said second comparing means shows that said correction frequency is less than said first reference correction frequency, so that said first damping coefficiency restoration means alters the setting of the damping coefficient from said first level to said second level more quickly than before said initial range is corrected.

20. A suspension control system as claimed in claim 19, further comprising:
   third comparing means for comparing said correction frequency with a second reference correction frequency less than said first reference correction frequency and for outputting a comparison result; and
   third initial range correction means for correcting said initial range when said comparison result output by said third comparing means shows that said correction frequency is less than said second reference correction frequency, so that said first damping force restoration means alters the setting of the damping force from said first level to said second level more slowly than before said initial range is corrected.

21. A suspension control system as claimed in claim 14, further comprising correction means for determining whether or not said holding period becomes longer than a third period and for correcting said first period so that said first damping coefficient restoration means restores the setting of the damping coefficient from said first level to said second level more quickly than before said first period is corrected when it is determined that said holding period has become longer than said third period.

22. A suspension control system as claimed in claim 21, further comprising:
   determining means for determining whether or not said second period corrected by said correction means becomes greater than a limited period; and
   means, coupled to said shock absorber and said determining means, for restoring the setting of said damping coefficient to said second level when said determining means determines that said second period has become greater than said limited period.

23. A suspension control system as claimed in claim 22, further comprising initialization means for setting said second period to an initial period when said determining means determines that said second range has become longer than said limited range.

24. A suspension control system as claimed in claim 23, further comprising:
   frequency calculation means for calculating a first frequency which indicates the number of times that said second period becomes longer than said limited period during a predetermined period;
   first comparing means for comparing said first frequency with a predetermined reference frequency and for outputting a comparison result; and
   first initial period correction means for correcting said initial period when said comparison result shows that said first frequency is less than said reference frequency, so that said first damping coefficient restoration means alters the setting of the damping coefficient from said first level to said second level more quickly than before said initial period is corrected.

25. A suspension control system as claimed in claim 24, further comprising:
   correction frequency calculation means for calculating a correction frequency which indicates the number of times that said correction means corrects said second range for said predetermined period;
   second comparing means for comparing said correction frequency with a first reference correction frequency and for outputting a comparison result when said comparison result output by said first comparing means shows said first frequency is equal to or greater than said predetermined reference frequency; and
   second initial period correction means for correcting said initial period when said comparison result output by said second comparing means shows that said correction frequency is less than said first reference correction frequency, so that said first damping coefficient restoration means alters the setting of the damping coefficient from said first level to said second level more quickly than before said initial period is corrected.

26. A suspension control system as claimed in claim 19, further comprising:
   third comparing means for comparing said correction frequency with a second reference correction frequency less than said first reference correction frequency and for outputting a comparison result; and
   third initial range correction means for correcting said initial range when said comparison result output by said third comparing means shows that said correction frequency is less than said second reference correction frequency, so that said first damping force restoration means alters the setting of the damping force from said first level to said second level more slowly than before said initial range is corrected.

* * * * *